(12) United States Patent
Sen

(10) Patent No.: US 11,518,070 B2
(45) Date of Patent: Dec. 6, 2022

(54) COMPRESSION MOLDING MACHINE AND METHOD OF COMPRESSION MOLDING

(71) Applicant: PYXIS CF PTE. LTD., Singapore (SG)

(72) Inventor: Amlan Sen, Singapore (SG)

(73) Assignee: PYXIS CF PTE. LTD., Singapore (SG)

( * ) Notice: Subject to any disclaimer, the term of this patent is extended or adjusted under 35 U.S.C. 154(b) by 0 days.

(21) Appl. No.: 16/828,219

(22) Filed: Mar. 24, 2020

(65) Prior Publication Data
US 2020/0307037 A1 Oct. 1, 2020

(30) Foreign Application Priority Data
Mar. 27, 2019 (SG) .............................. 10201902756T

(51) Int. Cl.
*B29C 33/02* (2006.01)
*B29C 43/04* (2006.01)
(Continued)

(52) U.S. Cl.
CPC .............. *B29C 43/04* (2013.01); *B29C 43/34* (2013.01); *B29C 43/52* (2013.01); *B29C 43/58* (2013.01);
(Continued)

(58) Field of Classification Search
CPC ..... B29C 33/20; B29C 33/202; B29C 33/308; B29C 37/00; B29C 37/0005; B29C 43/00;
(Continued)

(56) References Cited

U.S. PATENT DOCUMENTS 3,555,607 A * 1/1971 Epain et al. .......... B30B 11/007
425/77
6,471,501 B1 10/2002 Shinma et al.
(Continued)

FOREIGN PATENT DOCUMENTS

CN 103648743 A 3/2014
CN 203919597 U 11/2014
(Continued)

OTHER PUBLICATIONS

First Office Action dated Sep. 9, 2020 in related Taiwan Application No. 109203489 filed Mar. 26, 2020 (18 pages) with Google machine translation (13 pages).
(Continued)

*Primary Examiner* — Joseph S Del Sole
*Assistant Examiner* — Thu-Khanh T. Nguyen
(74) *Attorney, Agent, or Firm* — Daniel F. Nesbitt; Nesbitt IP LLC

(57) ABSTRACT

A compression molding machine including a base part; a first mold chase fixed in a position spaced apart from the base part; a second mold chase disposed between the base part and the first mold chase, the second mold chase movable along a movement axis extending perpendicularly between the base part and the first mold chase; and a compression actuation arrangement for moving the second mold chase. The compression actuation arrangement including at least two independent actuating units, each having a first inverted wedge member, a second wedge member, and a drive mechanism. An inclined surface of the first inverted wedge member and an inclined surface of the second wedge member is slidably engaged to each other to convert a motion of the second wedge member along the transmission axis to a motion of the first inverted wedge member along the actuation axis for moving the second mold chase.

17 Claims, 6 Drawing Sheets

(51) Int. Cl.
   *B29C 43/58*   (2006.01)
   *B29C 43/34*   (2006.01)
   *B29C 43/52*   (2006.01)
   B29C 43/36   (2006.01)
   B29C 43/32   (2006.01)

(52) U.S. Cl.
   CPC ............... *B29C 2043/3211* (2013.01); *B29C 2043/3283* (2013.01); *B29C 2043/3433* (2013.01); *B29C 2043/3605* (2013.01); *B29C 2043/5808* (2013.01); *B29C 2043/5833* (2013.01)

(58) Field of Classification Search
   CPC ..... B29C 43/04; B29C 43/32; B29C 43/3283; B29C 43/34
   See application file for complete search history.

(56) References Cited

U.S. PATENT DOCUMENTS

| | | |
|---|---|---|
| 2004/0234361 A1 | 11/2004 | Nakamura et al. |
| 2018/0264691 A1 | 9/2018 | Chang et al. |

FOREIGN PATENT DOCUMENTS

| | | |
|---|---|---|
| CN | 104210067 A | 12/2014 |
| CN | 107170694 A | 9/2017 |
| CN | 212097188 U | 12/2020 |
| JP | H11274192 A | 10/1999 |
| TW | 410741 U | 11/2000 |
| TW | 201743414 A | 12/2017 |
| TW | M598223 U | 7/2020 |

OTHER PUBLICATIONS

Office Action and Search Report in Re-Examination dated Jun. 21, 2022 in related Taiwan Application No. 109110291 filed Mar. 26, 2020 (12 pages) with Google machine translation (7 pages).

First Office Action and Search Report dated Apr. 22, 2022 in related Chinese Application No. 202010221575.1 filed Mar. 26, 2020 (4 pages) with CNIPA machine translation (6 pages).

First Office Action dated Sep. 9, 2020 in related Taiwanese Application No. 109110291 filed Mar. 26, 2020 (18 pages) with Google machine translation (13 pages).

Final Office Action dated Jan. 26, 2021 in related Taiwanese Application No. 109110291 filed Mar. 26, 2020 (11 pages) with Google machine translation (13 pages).

* cited by examiner

COMPRESSION MOLDING MACHINE AND METHOD OF COMPRESSION MOLDING

TECHNICAL FIELD

Various embodiments generally relate to a compression molding machine. In particular, various embodiments generally relate to a compression molding machine for molding in a semiconductor packaging process. More particularly, various embodiments generally relate to a compression molding machine for panel level molding in a panel level packaging process for a panel based semiconductor assembly. Various embodiments also generally relate to a method of compression molding. In particular, various embodiments also generally relate to a method of compression molding in a semiconductor packaging process. More particularly, various embodiments generally relate to a method of compression molding for panel level molding in a panel level packaging process for a panel based semiconductor assembly.

BACKGROUND

In a panel-level packaging process, electronic elements, such as die, wafer, passive component and metallic component are mounted onto a large carrier and molded into a panel on the large carrier. The molded panel containing electronic elements is then released from the large carrier to expose the active surface of the electronic elements in order for circuits to be plated on the active surface of the electronic elements.

However, panel level molding of a large molded panel in the panel-level packaging process requires a large compression force and a high degree of parallelism. The large force is required due to the large molding area. The high degree of parallelism is required because even if the upper and lower hot plates of the molding apparatus are slightly not parallel with each other during the molding process, the uneven thickness of the molded panel would affect the subsequent packaging process significantly. In general, the convention molding machines are not able to provide an output of an extremely high pressure and a strict requirement of parallel degree.

Accordingly, there is a need for a more effective and reliable compression molding machine for panel level molding so as to address the above issues.

SUMMARY

According to various embodiments, there is provided a compression molding machine. The compression molding machine may include a first mold chase; a second mold chase opposed to the first mold chase; and a compression actuation arrangement including at least two actuating units for moving the second mold chase towards the first mold chase. Each of the two actuating units may include a first inverted wedge member and a second wedge member movable relative to the first inverted wedge member.

According to various embodiments, there is provided a compression molding machine. The compression molding machine may include a first mold chase; a second mold chase opposed to the first mold chase; and for moving the second mold chase towards the first mold chase, wherein the compression actuation arrangement comprises a first inverted wedge member and a second wedge member movable relative to the first inverted wedge member; and a secondary actuation arrangement configured to engage the second mold chase for moving the second mold chase towards the first mold chase.

According to various embodiments, there is provided a method of compression molding. The method including moving, via a compression actuation arrangement, a second mold chase towards a first mold chase. The second mold chase may be opposed to the first mold chase. The compression actuation arrangement may include at least two actuating units. Each actuating unit may include a first inverted wedge member and a second wedge member movable relative to the first inverted wedge member.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the invention. In the following description, various embodiments are described with reference to the following drawings, in which.

DETAILED DESCRIPTION

Figure 1A:
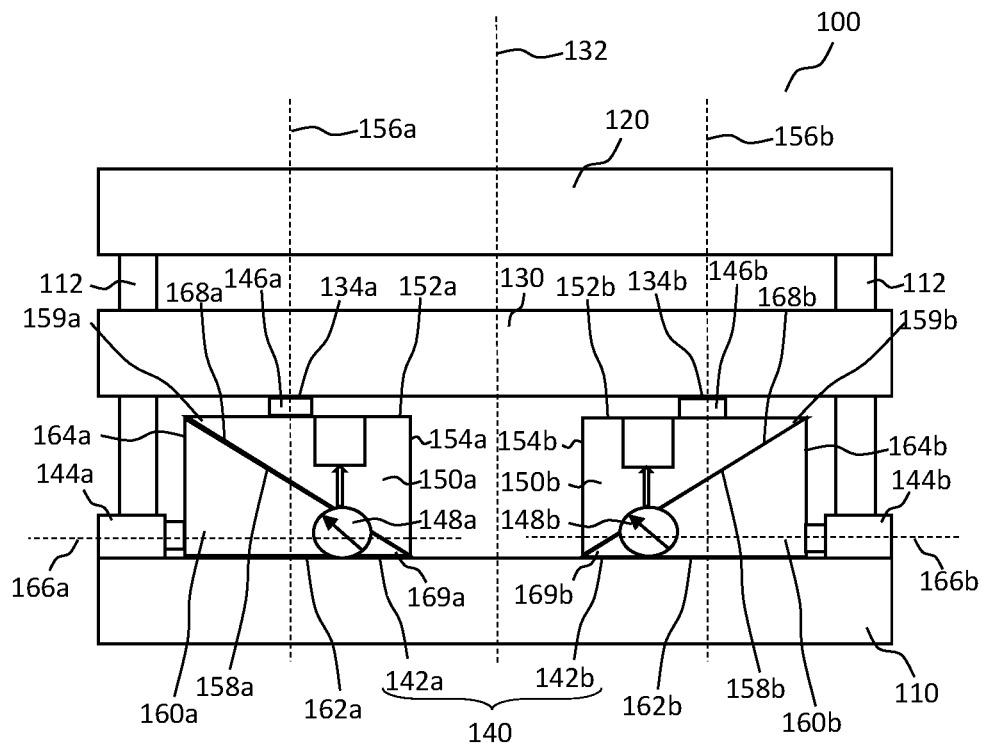
FIG. 1A and FIG. 1B show schematic diagrams of a compression molding machine for panel level molding according to various embodiments.

Embodiments described below in the context of the apparatus are analogously valid for the respective methods, and vice versa. Furthermore, it will be understood that the embodiments described below may be combined, for example, a part of one embodiment may be combined with a part of another embodiment.

It should be understood that the terms "on", "over", "top", "bottom", "down", "side", "back", "left", "right", "front", "lateral", "side", "up", "down" etc., when used in the following description are used for convenience and to aid understanding of relative positions or directions, and not intended to limit the orientation of any device, or structure or any part of any device or structure. In addition, the singular terms "a", "an", and "the" include plural references unless context clearly indicates otherwise. Similarly, the word "or" is intended to include "and" unless the context clearly indicates otherwise.

Conventional compression molding machines are generally classified into a toggle press type molding machine or a direct drive press type molding machine. Typically, in the toggle press type molding machine, a rated force is only produce at the end of the stroke and at the bottom dead center (BDC). In doing so, a high working pressure of the press is achieved using a toggle mechanism with a relatively low effort from the user. However, the toggle press type molding machine cannot provide a linear motion (or a linear relationship between distance vs. time). Thus it is difficult for the operator to control exactly the moving distance of the molding plate and the output pressure during the molding process. Accordingly, the toggle press type molding machine is not suitable for panel level molding in a panel level packaging process for a panel based semiconductor assembly.

For the direct drive press type molding machine, either the top chase (also known as top mold plate) or the bottom chase (also known as bottom mold plate) is directly driven by an actuator for the molding process to take place therebetween. Although a linear motion (or a linear relationship between distance vs. time) can be achieved, the accuracy of position control is typically not adequate for molding large panel as required for panel level molding in the panel level packaging process for the panel based semiconductor assembly. In addition, it is also difficult to achieve uniform pressure across a large area to ensure even thickness between the molding plates for molding large panel as required for panel level molding in the panel level packaging process for the panel based semiconductor assembly. The thicknesses of the molding resin layer at different locations may vary in a large range over the entire panel even if the upper and lower molding plates of the molding machine are slightly not parallel with each other during the molding process, since the panel has a very large area. The uneven thickness will affect the subsequent wiring process, which is a major obstacle to develop the panel level packaging process to a larger scale. In general, it is difficult to control the bottom surface of the upper molding plate and the top surface of the lower molding plate in a satisfactory or even perfectly parallel configuration during molding.

Further, panel level molding of a large scale also requires a larger compression force due to the larger molding area. However, the larger compression force demands a higher standard of the machinery which cannot be readily and easily provided by the conventional compression molding machines. In particular, it is difficult to achieve the high pressure required between the parallel hot plates with the direct drive press type molding machine.

Therefore, it is difficult and challenging to use conventional molding machines to achieve high pressure between parallel molding plates with precise control for molding large panel as required for panel level molding in the panel level packaging process for the panel based semiconductor assembly. The conventional compression machines also cannot meet the requirement of precisely controlling the height and parallelism of the top and bottom molding plate over the entire panel during panel level molding in the panel level packaging process for the panel based semiconductor assembly.

Various embodiments generally relate to a compression molding machine and a method of compression molding. In particular, various embodiments generally relate to a compression molding machine for panel level molding in a panel level packaging process for a panel based semiconductor assembly, and a method of compression molding for panel level molding in a panel level packaging process for a panel based semiconductor assembly. According to various embodiments, panel level molding may include placing a plurality of electronic elements, such as die, wafer, passive component and metallic component, onto a large carrier, laying a molding material or compound across the carrier to cover the plurality of electronic elements, and applying pressure and heat to mold and harden the molding material or compound so as to encapsulate the plurality of electronic elements in a single large molded panel.

According to various embodiments, the compression molding machine may be configured to produce a uniform and even thickness for the molded panel. According to various embodiments, the compression molding machine may move a mold chase evenly and uniformly to produce a molded panel with uniform and even thickness. According to various embodiments, the compression molding machine may adjust or vary the movement of the mold chase at different locations of the molding area to produce a molded panel with the desired thickness variation or profile. According to various embodiments, the compression molding machine may be configured to allow fine minute movement of the top or bottom mold chase for fine tuning or levelling of the top or bottom mold chase to achieve the desired thickness or thickness profile of the molded panel. According to various embodiments, the compression molding machine may be configured to allow adjustment of the top or bottom mold chase to ensure parallelism during molding. According to various embodiments, the compression molding machine may be configured to apply a sufficiently large pressure across the large molding area. According to various embodiments, the compression molding machine may be configured to allow even and/or uniform distribution of the pressure across the large molding area. According to various embodiments, the compression molding machine may be configured to allow variation of the pressure applied at different locations of the large molding area.

Figure 1B:
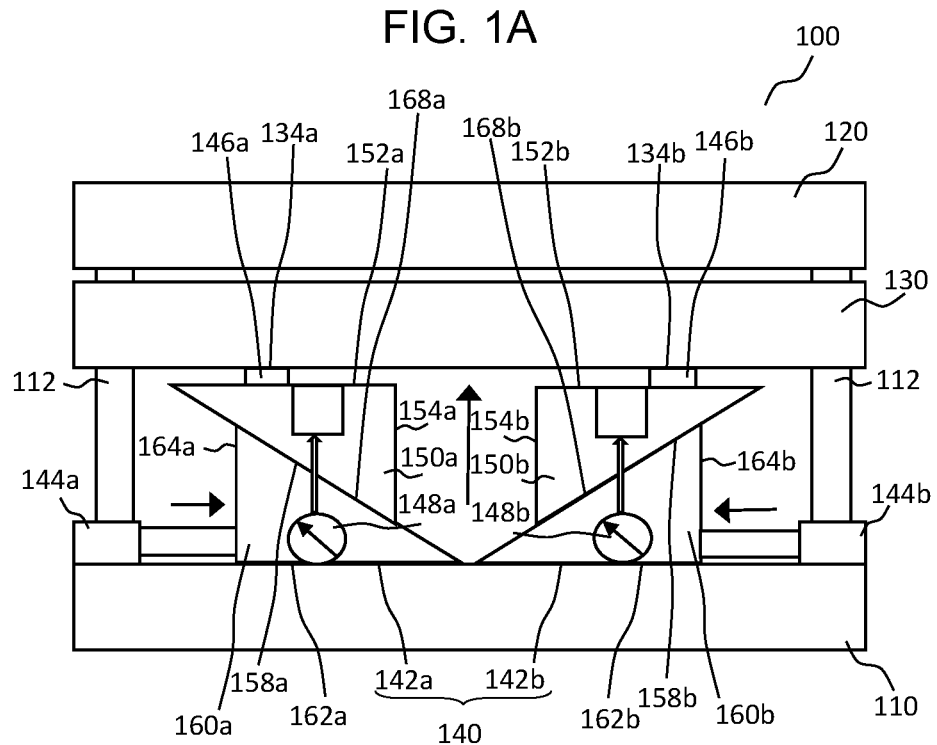

FIG. 1A and FIG. 1B show schematic diagrams of a compression molding machine 100 for panel level molding according to various embodiments. FIG. 1A shows the compression molding machine 100 in the initial state before being actuated for compression molding. FIG. 1B shows the compression molding machine 100 being actuated for performing compression molding. According to various embodiments, the compression molding machine 100 may include a base part 110. According to various embodiments, the base part 110 may be a foundation structure or a base support for the compression molding machine 100. According to various embodiments, the compression molding machine 100 may include a first mold chase 120 (or a top mold chase or a top mold plate) fixed in a position spaced apart from the base part 110 so as to be suspended above the base part 110. According to various embodiments, the first mold chase 120 may be a main body of a first mold part. According to various embodiments, the first mold chase 120 may be fixedly connected to the base part 110 via one or more support columns 112. Accordingly, the one or more support columns 112 may be extending between the base part 110 and the first mold chase 120 to fix the first mold chase 120 in a spaced relation with the base part 110. Hence, the first mold chase 120 may be supported by the one or more support columns 112 extending upright from the base part 110 such that the first mold chase 120 may be held above the base part 110.

According to various embodiments, the compression molding machine 100 may include a second mold chase 130 (or a bottom mold chase or a bottom mold plate) disposed between the base part 110 and the first mold chase 120. According to various embodiments, the second mold chase 130 may be a main body of a second mold part. According to various embodiments, the second mold chase 130 may be directly between the base part 110 and the first mold chase 120. Accordingly, the second mold chase 130 may be located within a space above the base part 110 and below the first mold chase 120. According to various embodiments, a molding surface of the second mold chase 130 may be directed towards the first mold chase 120 and an opposite surface of the second mold chase 130 may be directed towards the base part 110.

According to various embodiments, the second mold chase 130 may be movable relative to the base part 110 and the first mold chase 120 along a movement axis 132 extending perpendicularly between the base part 110 and the first mold chase 120. According to various embodiments, with the first mold chase 120 fixed with respect to the base part 110, the second mold chase 130 may be moved between the base part 110 and the first mold chase 120, whereby the second mold chase 130 may move away from the base part 110 and towards the first mold chase 120, or move away from the first mold chase 120 and towards the base part 110. Accordingly, the second mold chase 130 may reciprocate back and forth in a linear manner between the base part 110 and the first mold chase 120. According to various embodiments, the movement axis 132 of the second mold chase 130 may be parallel to the one or more support columns 112 extending between the base part 110 and the first mold chase 120. According to various embodiments, the second mold chase 130 may be in sliding engagement with the one or more support columns 112 extending between the base part 110 and the first mold chase 120. According to various embodiments, the second mold chase 130 may include one or more through-cavities (or through-channels) slidably placed over the one or more support columns 112 respectively such that the one or more support columns 112 may be inserted through the one or more through-cavities (or through-channels) to enable the second mold chase 130 for sliding along the one or more support columns 112. Accordingly, the one or more support columns 112 may guide or restrain the sliding movements of the second mold chase 130 between the base part 110 and the first mold chase 120 along the movement axis 132.

According to various embodiments, the compression molding machine 100 may include a compression actuation arrangement 140 disposed between the second mold chase 130 and the base part 110 for moving the second mold chase 130 with respect to the base part 110 along the movement axis 132 towards the first mold chase 120 for cooperatively applying a compression force therebetween. Accordingly, the second mold chase 130 may be urged against the first mold chase 120 by the compression actuation arrangement 140 in a manner such that a compression force is generated between the second mold chase 130 and the first mold chase 120. According to various embodiments, the compression actuation arrangement 140 may be mounted to the base part 110 and may be configured to engage the second mold chase 130 so as to move the second mold chase 130 with respect to the base part 110 along the movement axis 132.

According to various embodiments, the compression actuation arrangement 140 may include at least two actuating units 142a, 142b disposed to independently actuate at least two different portions 134a, 134b of the second mold chase 130 respectively. According to various embodiments, the compression actuation arrangement 140 may include two, or three, or four, or five, or six, or more actuating units. According to various embodiments, the at least two actuating units 142a, 142b may be spaced apart laterally on the base part 110. According to various embodiments, each actuating unit 142a, 142b may be independently controlled and operated. Accordingly, each actuating unit 142a, 142b may be controlled and operated on its own without being linked or influenced or controlled or interfered by the other actuating unit. According to various embodiments, with the at least two actuating units 142a, 142b independently actuable to move the second mold chase 130, tilting or levelling or balancing of the second mold chase 130 may be achievable so as to adjust a degree of parallelism between the first mold chase 120 and the second mold chase 130 to control a thickness or thickness profile of the panel being molded between the first mold chase 120 and second mold chase 130.

According to various embodiments, each actuating unit 142a, 142b may include a first inverted wedge member 150a, 150b movable relative to the base part 110 along an actuation axis 156a, 156b parallel to the movement axis 132 of the second mold chase 130. According to various embodiments, the first inverted wedge member 150a, 150b may reciprocate back and forth in a linear manner along the actuation axis 156a, 156b. According to various embodiments, the first inverted wedge member 150a, 150b may be oriented with a base 152a, 152b directed towards the second mold chase 130, wherein the base 152a, 152b of the first inverted wedge member 150a, 150b may be perpendicular to the movement axis 132 and a height of the first inverted wedge member 150a, 150b may be parallel to the movement axis 132. According to various embodiments, the first inverted wedge member 150a, 150b may include any suitable wedge shaped. For example, as shown in FIG. 1A and FIG. 1B, the first inverted wedge member 150a, 159b may include a right-angled-triangular-prism shaped wedge member oriented with a surface of the base 152a, 152b directed towards the second mold chase 130 and a vertical surface 154a, 154b parallel to the movement axis 132. According to various embodiments, the first inverted wedge member 150a, 150b may be moved along the actuation axis 156a, 156b to engage and urge against a corresponding portion 134a, 134b of the second mold chase 130 for moving the second mold chase 130. According to various embodiments, the base 152a, 152b of the first inverted wedge member 150a, 150b may engage and urge against the corresponding portion 134a, 134b of the second mold chase 130. According to various embodiments, the first inverted wedge member 150a, 150b may be restrained to move only along the actuation axis 156a, 156b. According to various embodiments, the first inverted wedge member 150a, 150b may be coupled to a guide rod or a guide track, which is parallel to the actuation axis 156a, 156b, for moving along the actuation axis 156a, 156b. According to various embodiments, the actuation axis 156a, 156b of each actuating unit 142a, 142b may intersect the corresponding portion 134a, 134b of the second mold chase 130. According to various embodiments, the first inverted wedge member 150a of a first 142a of the at least two actuating units and the first inverted wedge member 150b of a second 142b of the at least two actuating units may be moved by a same distance along respective actuation axis 156a, 156b such that an uniform movement of the second mold chase 130 may be achieved. According to various embodiments, the first inverted wedge member 150a of a first 142a of the at least two actuating units and the first inverted wedge member 150b of a second 142b of the at least two actuating units may be pre-set to be at a different initial height such that an initial orientation of the second mold chase 130 may be tilted. Subsequently, the first inverted wedge member 150a of a first 142a of the at least two actuating units and the first inverted wedge member 150b of a second 142b of the at least two actuating units may be moved by a same distance along respective actuation axis 156a, 156b such that the second mold chase 130 may be uniformly moved in the tilted orientation. According to various embodiments, the first inverted wedge member 150a of a first 142a of the at least two actuating units and the first inverted wedge member 150b of a second 142b of the at least two actuating units may be moved by a different distance along respective actuation axis 156a, 156b such that tilting or levelling or balancing of the second mold chase 130 may be achieved to adjust the degree of parallelism between the first mold chase 120 and the second mold chase 130.

According to various embodiments, each actuating unit 142*a*, 142*b* may include a second wedge member 160*a*, 160*b* movable relative to the first inverted wedge member 150*a*, 150*b* along a transmission axis 166*a*, 166*b* perpendicular to the movement axis 132 of the second mold chase 130. According to various embodiments, the second wedge member 160*a*, 160*b* may reciprocate back and forth in a linear manner along the transmission axis 166*a*, 166*b*. According to various embodiments, the second wedge member 160*a*, 160*b* may be oriented with a base 162*a*, 162*b* directed towards the base part 110, wherein the base 162*a*, 162*b* of the second wedge member 160*a*, 160*b* may be perpendicular to the movement axis 132 and a height of the second wedge member 160*a*, 160*b* may be parallel to the movement axis 132. According to various embodiments, the second wedge member 160*a*, 160*b* may include any suitable wedge shaped. For example, as shown in FIG. 1A and FIG. 1B, the second wedge member 160*a*, 160*b* may include a right-angled-triangular-prism shaped wedge member oriented with a surface of the base 162*a*, 162*b* directed towards the base part 110 and a vertical surface 164*a*, 164*b* parallel to the movement axis 132. According to various embodiments, the second wedge member 160*a*, 160*b* may be restrained to move only along the transmission axis 166*a*, 166*b*. According to various embodiments, the second wedge member 160*a*, 160*b* may be coupled to a guide rod or a guide track, which is parallel to the transmission axis 166*a*, 166*b*, for moving along the transmission axis 166*a*, 166*b*.

According to various embodiments, each actuating unit 142*a*, 142*b* may include a drive mechanism 144*a*, 144*b* coupled to the second wedge member 160*a*, 160*b* to move the second wedge member 160*a*, 160*b* along the transmission axis 166*a*, 166*b*. According to various embodiments, the drive mechanism 144*a*, 144*b* may include a linear actuator such as, but not limited to, an electro-mechanical linear actuator which converts rotary motion of a motor to a linear motion, a hydraulic actuator, a pneumatic actuator, a linear motor, or a telescoping linear motor. According to various embodiments, the drive mechanism 144*a*, 144*b* may move the second wedge member 160*a*, 160*b* linearly along the transmission axis 166*a*, 166*b*. According to various embodiments, the drive mechanism 144*a*, 144*b* may move the second wedge member 160*a*, 160*b* based on a drive-control signal. According to various embodiments, the drive mechanisms 144*a*, 144*b* of the at least two actuating units 142*a*, 142*b* may be independently controlled to drive the second wedge members 160*a*, 160*b* respectively to be moved by a different distance. According to various embodiments, the drive mechanisms 144*a*, 144*b* of the at least two actuating units 142*a*, 142*b* may receive individual drive-control signals respectively, which may be different from each other.

According to various embodiments, in each actuating unit 142*a*, 142*b*, an inclined surface 158*a*, 158*b* of the first inverted wedge member 150*a*, 150*b* and an inclined surface 168*a*, 168*b* of the second wedge member 160*a*, 160*b* may be slidably engaged to each other in a manner so as to convert a motion of the second wedge member 160*a*, 160*b* along the transmission axis 166*a*, 166*b* to a motion of the first inverted wedge member 150*a*, 150*b* along the actuation axis 156*a*, 156*b* for moving the second mold chase 130 along the movement axis 132. According to various embodiments, an angle formed between the inclined surface 158*a*, 158*b* and the base 152*a*, 152*b* of the first inverted wedge member 150*a*, 150*b* may be the same as an angle formed between the inclined surface 168*a*, 168*b* and the base 162*a*, 162*b* of the second wedge member 160*a*, 160*b*. According to various embodiments, when the inclined surface 158*a*, 158*b* of the first inverted wedge member 150*a*, 150*b* and the inclined surface 168*a*, 168*b* of the second wedge member 160*a*, 160*b* are in sliding contact with each other, the base 152*a*, 152*b* of the first inverted wedge member 150*a*, 150*b* and the base 162*a*, 162*b* of the second wedge member 160*a*, 160*b* may be parallel to each other. Further, a thin end 159*a*, 159*b* of the first inverted wedge member 150*a*, 150*b* whereby the base 152*a*, 152*b* and the inclined surface 158*a*, 158*b* of the first inverted wedge member 150*a*, 150*b* converges may be directed opposite to a direction of a thin end 169*a*, 169*b* of the second wedge member 160*a*, 160*b* whereby the base 162*a*, 162*b* and the inclined surface 168*a*, 168*b* of the second wedge member 160*a*, 160*b* converges. According to various embodiments, when the second wedge member 160*a*, 160*b* is moved along the transmission axis 166*a*, 166*b*, the inclined surface 168*a*, 168*b* of the second wedge member 160*a*, 160*b*, which is at an angle with respect to the transmission axis 166*a*, 166*b*, may slide against the inclined surface 158*a*, 158*b* of the first inverted wedge member 150*a*, 150*b*, which is at an angle with respect to the actuation axis 156*a*, 156*b*, to convert the linear motion of the second wedge member 160*a*, 160*b* along the transmission axis 166*a*, 166*b* into the linear motion of the first inverted wedge member 150*a*, 150*b* along the actuation axis 156*a*, 156*b*.

According to various embodiments, the compression actuation arrangement 140 may be operable to move the second mold chase 130 towards the first mold chase 120 for cooperatively applying a compression force therebetween. According to various embodiments, by controlling the drive mechanisms 144*a*, 144*b* of the at least two actuating units 142*a*, 142*b* of the compression actuation arrangement 140 to move the second wedge members 160*a*, 160*b* of the at least two actuating units 142*a*, 142*b* respectively, the motions of the second wedge members 160*a*, 160*b* of the at least two actuating units 142*a*, 142*b* may be converted to the motions of the first inverted wedge members 150*a*, 150*b* of the at least two actuating units 142*a*, 142*b* for engaging and urging the second mold chase 130 to move towards the first mold chase 120. Accordingly, the compression actuation arrangement 140 may translate the movement of the second mold chase 130 towards the first mold chase 120 as a compression force for compressing molding materials placed between the second mold chase 130 and the first mold chase 120.

According to various embodiments, the compression molding machine 100 may include a first heating arrangement underneath the first mold chase 120. According to various embodiments, the compression molding machine 100 may include a second heating arrangement on an upper surface of the second mold chase 130. According to various embodiments, the first heating arrangement may be disposed on the first mold chase 120 and directed towards the second mold chase 130. Similarly, the second heating arrangement may be disposed on the second mold chase 130 and directed towards the first mold chase 120. According to various embodiments, each of the first and second heating arrangements may include, but not limited to, a heating plate, a heating film, or a heating wire. According to various embodiments, with the first and second heating arrangements disposed on the first mold chase 120 and the second mold chase 130 respectively, the compression molding machine 100 may be capable of applying heat during molding of materials. According to various embodiments, each of the first and second heating arrangements 120, 130 may be controlled based on heating-control signals.

According to various embodiments, each of the actuating unit 142a, 142b of the compression actuation arrangement 140 may include a force sensor 146a, 146b disposed between the drive mechanism 144a, 144b and the second mold chase 130. According to various embodiments, the force sensor 146a, 146b may be disposed between the second mold chase 130 and the first inverted wedge member 150a, 150b. Accordingly, the force sensor 146a, 146b may be configured to measure a force or pressure or compression directly applied by the first inverted wedge member 150a, 150b to the second mold chase 130. According to various embodiments, the force sensor 146a, 146b may be disposed between the drive mechanism 144a, 144b and the second wedge member 160a, 160b. Accordingly, the force sensor 146a, 146b may be configured to measure a force or pressure or compression directly applied by the drive mechanism 144a, 144b to the second wedge member 160a, 160b as a measure of the force or pressure or compression applied by the actuating unit 142a, 142b on the second mold chase 130. According to various embodiments, the force sensor 146a, 146b may be configured to provide a force detection signal indicating the magnitude of the force or pressure or compression detected. According to various embodiments, the force sensor 146a, 146b may include, but not limited to, a load cell, a strain gauge, or a piezoelectric sensor.

According to various embodiments, each of the actuating unit 142a, 142b of the compression actuation arrangement 140 may include a position sensor 148a, 148b fixed to the first inverted wedge member 150a, 150b or to the base part 110 for determining a displacement of the first inverted wedge member 150a, 150b with respect to the base part 110 along the actuation axis 156a, 156b. According to various embodiments, when the position sensor 148a, 148b is fixed to the first inverted wedge member 150a, 150b, the position sensor 148a, 148b may measure a distance from the position sensor 148a, 148b to the base part 110 as the first inverted wedge member 150a, 150b, together with the position sensor 148a, 148b, is being moved to determine the displacement of the first inverted wedge member 150a, 150b. According to various embodiments, when the position sensor 148a, 148b is fixed to the base part 110, the position sensor 148a, 148b may measure a distance from the position sensor 148a, 148b to a reference position (e.g. a protrusion or a reference structure) as the first inverted wedge member 150a, 150b, together with the reference position, is being moved to determine the displacement of the first inverted wedge member 150a, 150b. According to various embodiments, the position sensor 148a, 148b may be configured to provide a position detection signal indicating a distance between the first inverted wedge member 150a, 150b and the base part 110, or a displacement of the first inverted wedge member 150a, 150b. According to various embodiments, the position sensor 148a, 148b may include but not limited to a position encoder, a displacement sensor, a proximity sensor, a laser sensor, a light sensor or an ultrasonic sensor.

According to various embodiments, the at least two actuating units 142a, 142b of the compression actuation arrangement 140 may be arranged to be in mirror symmetry with respect to each other in a manner such that the transmission axes 166a, 166b of the second wedge members 160a, 160b of the at least two actuating units 142a, 142b may be coaxial. For example, as shown in FIG. 1A and FIG. 1B, according to various embodiments, the thin end 159a of the first inverted wedge member 150a of the first 142a of the at least two actuating units and the thin end 159b of the first inverted wedge member 150b of the second 142b of the at least two actuating units may be directed away from each other so as to be in mirror symmetry with respect to each other. Further, the thin end 169a of the second wedge member 160a of the first 142a of the at least two actuating units and the thin end 169b of the second wedge member 160b of the second 142b of the at least two actuating units may be directed towards each other so as to be in mirror symmetry with respect to each other. According to various embodiments, the orientations of the first inverted wedge members 150a, 150b and the second wedge members 160a, 160b may be reversed. According to various embodiments, arranging the at least two actuating units 142a, 142b in mirror symmetry may provide an optimal configuration for actuating at least two opposite portions 134a, 134b of the second mold chase 130 to tilt or level or balance the second mold chase 130 with respect to the first mold chase 120.

Figure 2A:
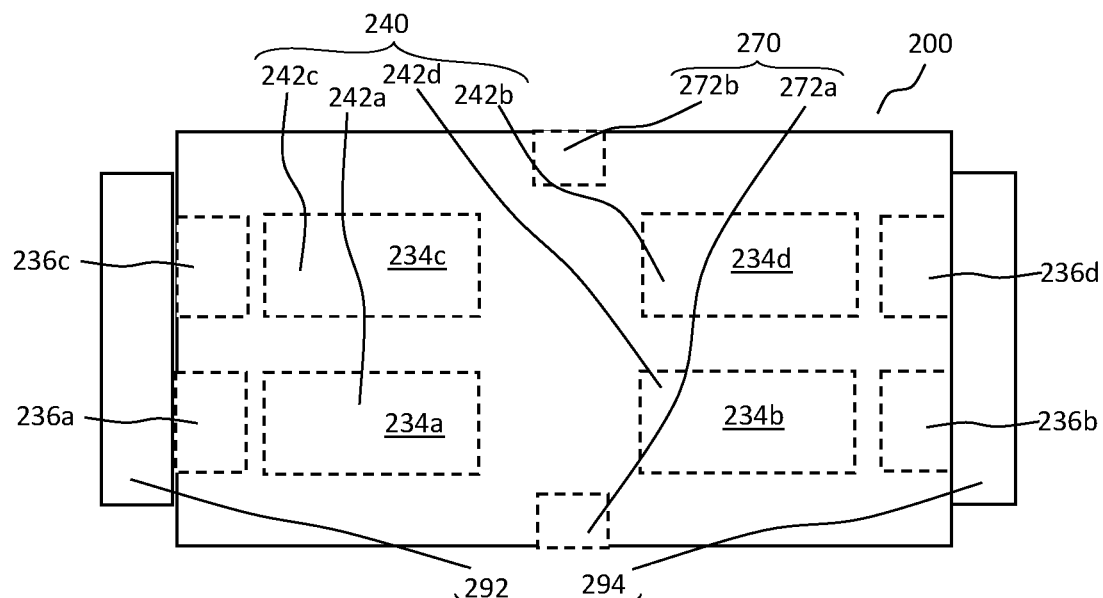
FIG. 2A shows a schematic top view of a compression molding machine for panel level molding according to various embodiments.
Figure 2B:
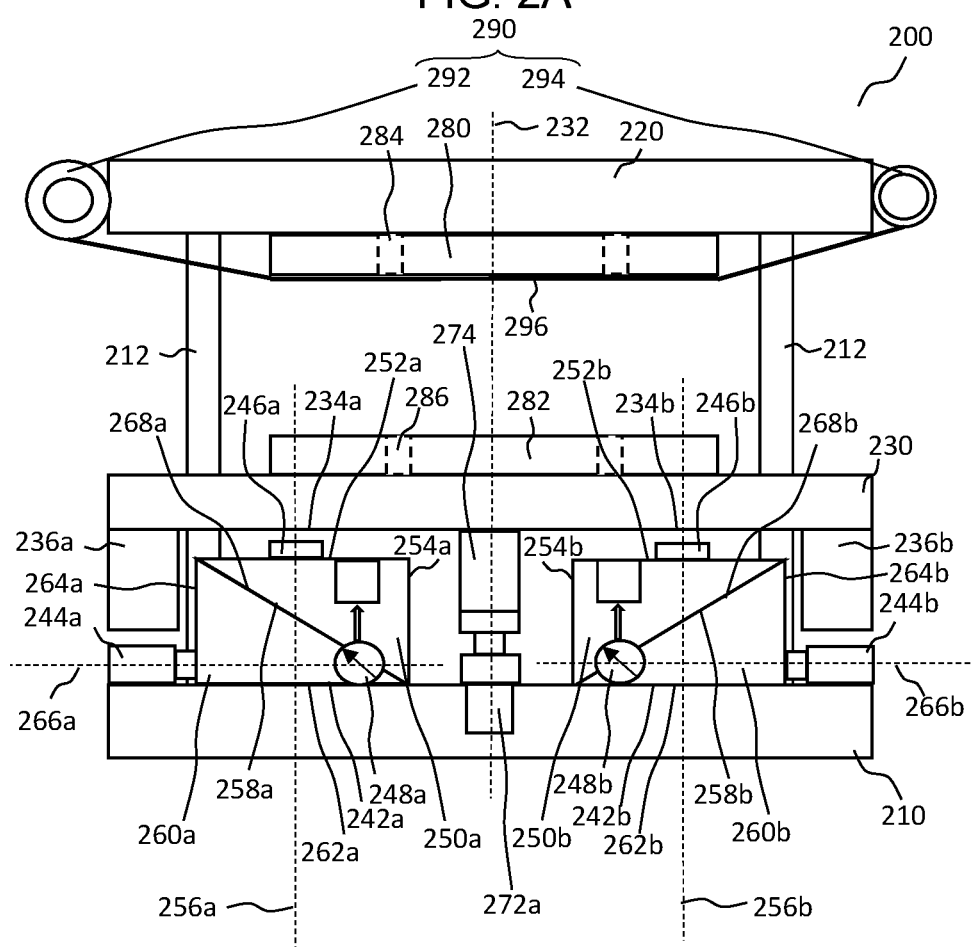
FIG. 2B shows schematic side view of the compression molding machine of FIG. 2A for panel level molding according to various embodiments.

FIG. 2A shows a schematic top view of a compression molding machine 200 for panel level molding according to various embodiments. FIG. 2B shows schematic side view of the compression molding machine 200 for panel level molding according to various embodiments. According to various embodiments, the compression molding machine 200 may, similar to the compression molding machine 100 of FIG. 1A and FIG. 1B, include a base part 210. According to various embodiments, the base part 210 may be a foundation structure or a base support for the compression molding machine 200. According to various embodiments, the compression molding machine 200, may similar to the compression molding machine 100 of FIG. 1A and FIG. 1B, include a first mold chase 220 (or a top mold chase or a top mold plate) fixed in a position spaced apart from the base part 210 so as to be suspended above the base part 210. According to various embodiments, the first mold chase 220 may be a main body of a first mold part. According to various embodiments, the first mold chase 220 may be fixedly connected to the base part 210 via one or more support columns 212. Accordingly, the one or more support columns 212 may be extending between the base part 210 and the first mold chase 220 to fix the first mold chase 220 in a spaced relation with the base part 210. Hence, the first mold chase 220 may be supported by the one or more support columns 212 extending upright from the base part 210 such that the first mold chase 220 may be held above the base part 210.

According to various embodiments, the compression molding machine 200 may, similar to the compression molding machine 100 of FIG. 1A and FIG. 1B, include a second mold chase 230 (or a bottom mold chase or a bottom mold plate) disposed between the base part 210 and the first mold chase 220. According to various embodiments, the second mold chase 230 may be a main body of a second mold part. According to various embodiments, the second mold chase 230 may be directly between the base part 210 and the first mold chase 220. Accordingly, the second mold chase 230 may be located within a space above the base part 210 and below the first mold chase 220. According to various embodiments, a molding surface of the second mold chase 230 may be directed towards the first mold chase 220 and an opposite surface of the second mold chase 230 may be directed towards the base part 210.

According to various embodiments, the second mold chase 230 may be movable relative to the base part 210 and the first mold chase 220 along a movement axis 232 extending perpendicularly between the base part 210 and the first mold chase 220. According to various embodiments, with the first mold chase 220 fixed with respect to the base part 210, the second mold chase 230 may be moved between the base part 210 and the first mold chase 220, whereby the second mold chase 230 may move away from the base part 210 and towards the first mold chase 220, or move away from the first mold chase 220 and towards the base part 210. Accordingly, the second mold chase 230 may reciprocate back and forth in a linear manner between the base part 210 and the first mold chase 220. According to various embodiments, the movement axis 232 of the second mold chase 230 may be parallel to the one or more support columns 212 extending between the base part 210 and the first mold chase 220. According to various embodiments, the second mold chase 230 may be in sliding engagement with the one or more support columns 212 extending between the base part 210 and the first mold chase 220. According to various embodiments, the second mold chase 230 may include one or more through-cavities (or through-channels) slidably placed over the one or more support columns 212 respectively such that the one or more support columns 212 may be inserted through the one or more through-cavities (or through-channels) to enable the second mold chase 230 for sliding along the one or more support columns 212. Accordingly, the one or more support columns 212 may guide or restrain the sliding movements of the second mold chase 230 between the base part 210 and the first mold chase 220 along the movement axis 232.

According to various embodiments, the compression molding machine 200 may include a compression actuation arrangement 240 disposed between the second mold chase 230 and the base part 210 for moving the second mold chase 230 with respect to the base part 210 along the movement axis towards the first mold chase 220 for cooperatively applying a compression force therebetween. Accordingly, the second mold chase 230 may be urged against the first mold chase 220 by the compression actuation arrangement 240 in a manner such that a compression force is generated between the second mold chase 230 and the first mold chase 220. According to various embodiments, the compression actuation arrangement 240 may be mounted to the base part 210 and may be configured to engage the second mold chase 230 so as to move the second mold chase 230 with respect to the base part 210 along the movement axis 232 towards the first mold chase 220.

According to various embodiments, the compression actuation arrangement 240 may, similar to the compression molding machine 100 of FIG. 1A and FIG. 1B, include at least two actuating units (for example, four actuating units 242a, 242b, 242c, 242d) disposed to independently actuate at least two different portions (for example, four portions 234a, 234b, 234c, 234d) of the second mold chase 230 respectively. According to various embodiments, the compression actuation arrangement 240 may include two, or three, or four, or five, or six, or more actuating units. For example, as shown in FIG. 2A, according to various embodiments, the compression actuation arrangement 240 may include four actuating units 242a, 242b, 242c, 242d. According to various embodiments, the four actuating units 242a, 242b, 242c, 242d may be spaced apart from each other and distributed on the base part 210. According to various embodiments, the four actuating units 242a, 242b, 242c, 242d may be disposed to form a rectangular or square pattern with each actuating unit 242a, 242b, 242c, 242d being disposed at a corner of the rectangular or square pattern to independently actuate four different portions 234a, 234b, 234c, 234d of the second mold chase 230 respectively. According to various embodiments, when there are five actuating units (not shown), the five actuating units may be disposed to form a pentagon pattern with each actuating unit being disposed at a corner of the pentagon pattern, or the five actuating units may be disposed with four actuating units forming four corners of a rectangular or square pattern and a fifth actuating unit disposed in the center of the rectangular or square pattern. According to various embodiments, when there are six actuating units (not shown), the six actuating units may be arranged in a two by two configuration, i.e. side by side in pairs, to form a rectangular pattern with a second pair lined up behind a first pair and a third pair lined up behind the second pair. According to various embodiments, depending on the number of actuating units, the actuating units may be arranged in a suitable pattern and configuration to form the compression actuation arrangement 240.

According to various embodiments, each actuating unit 242a, 242b, 242c, 242d may be independently controlled and operated. Accordingly, each actuating unit 242a, 242b, 242c, 242d may be controlled and operated on its own without being linked or influenced or controlled or interfered by the other actuating unit. According to various embodiments, as shown in FIG. 2A, with the four actuating units 242a, 242b, 242c, 242d independently actuable to move the second mold chase 230 at four different portions 234a, 234b, 234c, 234d, tilting or levelling or balancing of the second mold chase 230 may be achievable so as to adjust a degree of parallelism between the first mold chase 220 and the second mold chase 230 to control a thickness or thickness profile of the panel being molded between the first mold chase 220 and second mold chase 230.

According to various embodiments, the compression molding machine 200 may include a secondary actuation arrangement 270 disposed between the second mold chase 230 and the base part 210 for moving the second mold chase 230 along the movement axis 232 to a predetermined position. According to various embodiments, the secondary actuation arrangement 270 may be mounted to the base part 210 and may be configured to engage the second mold chase 230 so as to move the second mold chase 230 to the predetermined position with respect to the base part 210 along the movement axis 232. According to various embodiments, the predetermined position may be a position whereby the second mold chase 230 is placed close to the first mold chase 220 without generating any compression therebetween. Subsequently, the compression actuation arrangement 240 may be operated to move the second mold chase 230 along the movement axis 232 from the predetermined position towards the first mold chase 220 for cooperatively applying a compression force between the first and second mold chase 220, 230. Accordingly, the secondary actuation arrangement 270 may be operable to move the second mold chase 230 quickly to the predetermined position for closing the second mold chase 230 towards the first mold chase 220 after loading of the materials to be molded, and the compression actuation arrangement 240 may be the main actuation arrangement for performing compression molding. According to various embodiments, having separate actuation arrangement for closing the first and second mold chase 220, 230 and for performing the actual compression molding allows better efficiency as well as better and finer control of the actual compression molding process.

According to various embodiments, the secondary actuation arrangement 270 may include at least one linear actuator 272a, 272b coupled to the base part 210. According to various embodiments, the at least one linear actuator 272a, 272b may include a linearly actuated arm 274 to engage and move the second mold chase 230 along the movement axis 232. According to various embodiments, the at least one linear actuator 272a, 272b may be mounted to the base part 210. According to various embodiments, the linearly actuated arm 274 may be extendable from the base part 210 to engage and move the second mold chase 230. According to various embodiments, the at least one linear actuator 272a, 272b may include, but not limited to, a screw type linear actuator, a wheel and axle type linear actuator, a cam type linear actuator, or a piston type linear actuator. According to various embodiments, the screw type linear actuator may include a ball screw, a roller screw, a leadscrew, or a screw jack. The screw type linear actuator may provide a fast and efficient manner for moving the second mold chase 230. According to various embodiments, the wheel and axle type linear actuator may include a rotating wheel moving a cable, rack, chain or belt such as, a hoist, a winch, a rack and pinion, a chain drive, or a belt drive. According to various embodiments, the cam type linear actuator may include a cam and follower. According to various embodiments, the piston type linear actuator may be hydraulic operated or pneumatic operated.

According to various embodiments, the secondary actuation arrangement 270 may include one or two or three or four or more linear actuators. For example, as shown in FIG. 2A, according to various embodiments, the secondary actuation arrangement 270 may include two linear actuators 272a, 272b. According to various embodiments, the two linear actuators 272a, 272b may be spaced apart from each other. According to various embodiments, a first 272a of the two linear actuators may be disposed outside a first side of the rectangular or square pattern formed by the four actuating units 242a, 242b, 242c, 242d. According to various embodiments, the first 272a of the two linear actuators may be adjacent a mid-portion of the first side of the rectangular or square pattern formed by the four actuating units 242a, 242b, 242c, 242d. According to various embodiments, a second 272b of the two linear actuators may be disposed outside the second side of the rectangular or square pattern formed by the four actuating units 242a, 242b, 242c, 242d. According to various embodiments, the second 272b of the two linear actuators may be adjacent a mid-portion of the second side of the rectangular or square pattern formed by the four actuating units 242a, 242b, 242c, 242d. According to various embodiments, the first side and the second side of the rectangular or square pattern formed by the four actuating units 242a, 242b, 242c, 242d may be two opposite sides of the rectangular or square pattern.

Figure 3A:
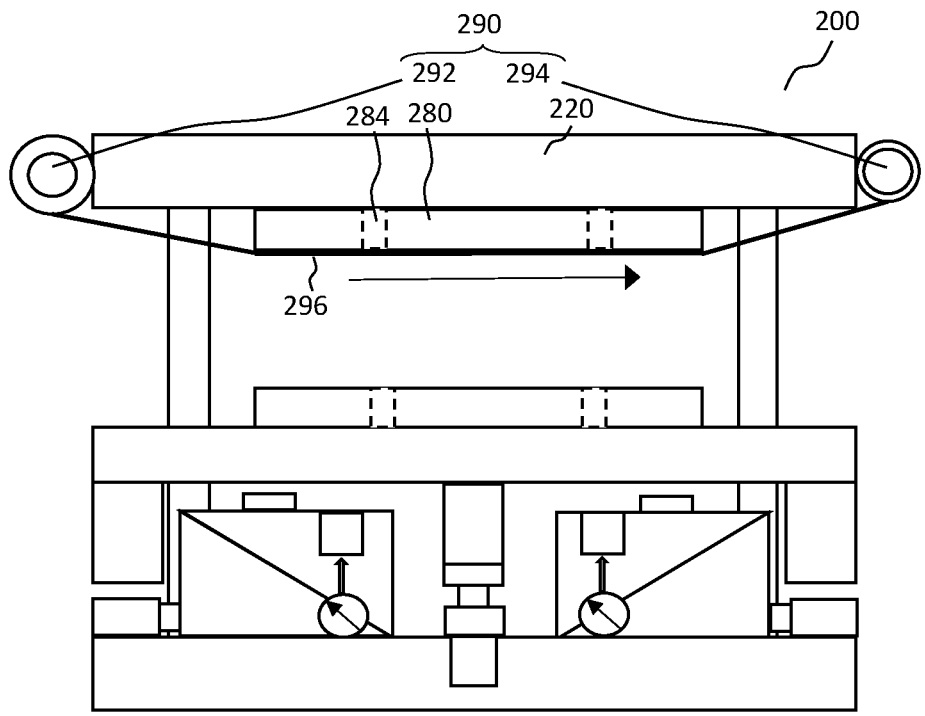
FIG. 3A to FIG. 3H show a series of schematic drawings illustrating a method of compression molding using the compression molding machine of FIG. 2B according to various embodiments.
Figure 3B:
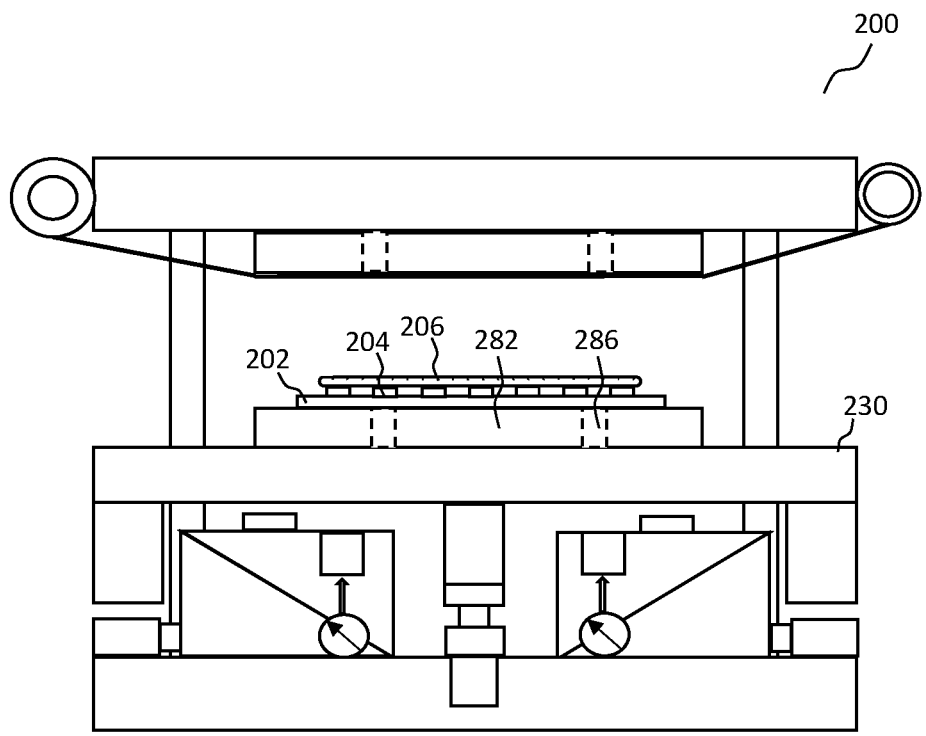
Figure 3C:
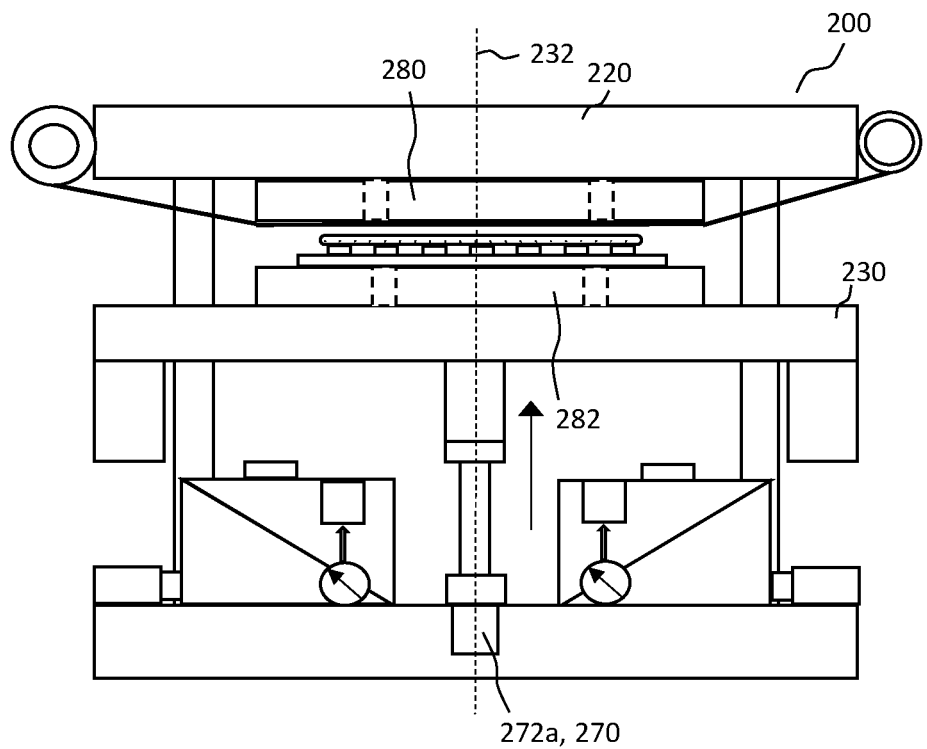

According to various embodiments, the two linear actuators 272a, 272b may be operable in a synchronous manner to move the second mold chase 230 to the predetermined position (for example, see FIG. 3C). According to various embodiments, the two linear actuators 272a, 272b may be driven by a single drive mechanism. Accordingly, the two linear actuators 272a, 272b may be operated in a synchronous manner based on a single actuator-control signal. According to various embodiments, the two linear actuators 272a, 272b may be driven via two separate drive mechanisms. Accordingly, the two linear actuators 272a, 272b may be operated in a synchronous manner based on identical actuator-control signals sent to the two drive mechanisms respectively.

According to various embodiments, compression molding machine 200 may include at least two sliding support blocks (for example, four sliding support blocks 236a, 236b, 236c, 236d) underneath the second mold chase 230. According to various embodiments, the at least two sliding support blocks (for example, the four sliding support blocks 236a, 236b, 236c, 236d) may be slidable relative to the second mold chase 230 along a sliding axis perpendicular to the movement axis 232 of the second mold chase 230 (for example, see FIG. 3D). According to various embodiments, compression molding machine 200 may include sliding tracks or rails or rods underneath the second mold chase 230. According to various embodiments, the sliding tracks or rails or rods may be perpendicular to the movement axis 232 of the second mold chase 230. According to various embodiments, the at least two sliding support blocks (for example, the four sliding support blocks 236a, 236b, 236c, 236d) may be in sliding engagement with the sliding tracks or rails or rods so as to be slidable relative to the second mold chase 230. According to various embodiments, when the second mold chase 230 is at the predetermined position along the movement axis 232, the at least two sliding support blocks (for example, the four sliding support blocks 236a, 236b, 236c, 236d) may be slidable towards each other so as to be positioned above a corresponding actuation units 242a, 242b, 242c, 242d of the compression actuation arrangement 240.

According to various embodiments, for each actuating unit 242a, 242b, 242c, 242d in the compression actuation arrangement 240, one sliding support block 236a, 236b, 236c, 236d may be provided underneath the second mold chase 230. According to various embodiments, when the second mold chase 230 is at the predetermined position along the movement axis 232, each sliding support block 236a, 236b, 236c, 236d may be slidable between a first position and a second position. According to various embodiments, the first position may be outside a footprint of the corresponding actuating unit 242a, 242b, 242c, 242d. According to various embodiments, the second position may be directly above the corresponding actuating unit 242a, 242b, 242c, 242d.

According to various embodiments, for example as shown in FIG. 2A, four sliding support blocks 236a, 236b, 236c, 236d which correspond to the four actuating units 242a, 242b, 242c, 242d may be provided underneath the second mold chase 230. According to various embodiments, when all the four sliding support blocks 236a, 236b, 236c, 236d are in the first position, the four sliding support blocks 236a, 236b, 236c, 236d may be hanging from the second mold chase 230 outside the footprint of the corresponding four actuating units 242a, 242b, 242c, 242d. Accordingly, the second mold chase 230 may not be in contact with the four actuating units 242a, 242b, 242c, 242d of the compression actuation arrangement 240 and the second mold chase 230 may be supported and moved by the secondary actuation arrangement 270. Hence, the secondary actuation arrangement 270 may move the second mold chase 230 closer to the base part 210 so as to open up a gap between the second mold chase 230 and the first mold chase for loading of materials to be molded. According to various embodiments, when the second mold chase 230 is closer to the base part 210, the four sliding support blocks 236a, 236b, 236c, 236d may be hanging from the second mold chase 230 in a manner so as to be adjacent to the corresponding four actuating units 242a, 242b, 242c, 242d.

Figure 3D:
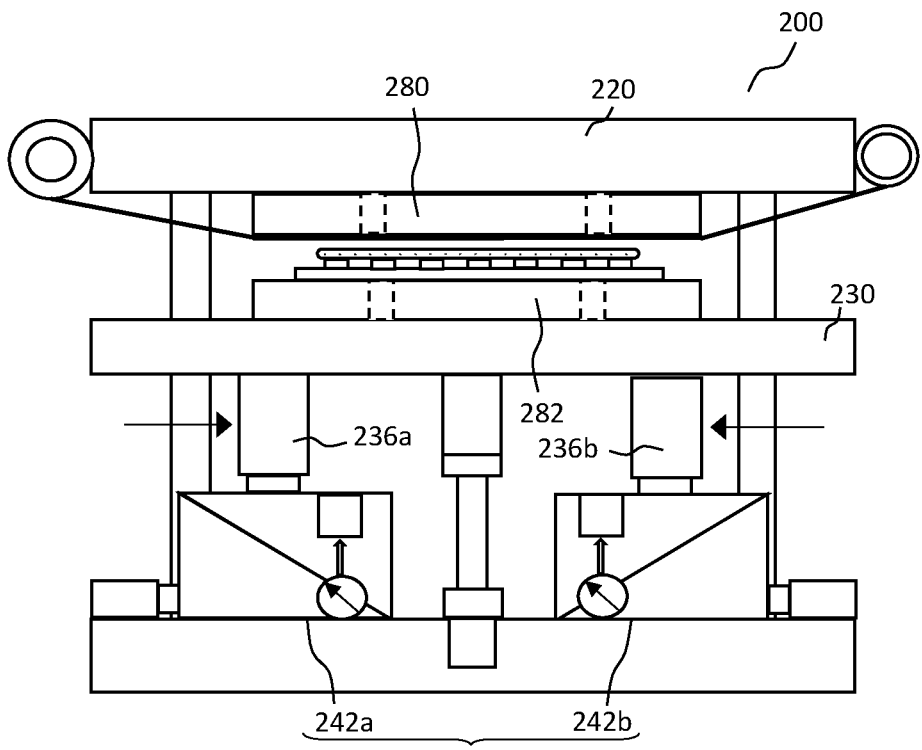

According to various embodiments, when the second mold chase 230 is moved to the predetermined position by the secondary actuation arrangement 270, the four sliding support blocks 236a, 236b, 236c, 236d may be slidable from the first position to the second position respectively (for example, see FIG. 3C and FIG. 3D). According to various embodiments, when all the four sliding support blocks 236a, 236b, 236c, 236d are in the second position, the four sliding support blocks 236a, 236b, 236c, 236d may be directly above the corresponding four actuating units 242a, 242b, 242c, 242d. Accordingly, the four actuating units 242a, 242b, 242c, 242d of the compression actuation arrangement 240 may be operated to engage and move the second mold chase 230 towards the first mold chase 220 for cooperatively applying the compression force therebetween, via engaging the four sliding support blocks 236a, 236b, 236c, 236d respectively with the corresponding four actuating units 242a, 242b, 242c, 242d.

Referring to FIG. 2B, only a first pair 242a, 242b of the four actuating units 242a, 242b, 242c, 242d of the compression actuation mechanism 240 is shown. According to various embodiments, a second pair 242c, 242d of the four actuating units 242a, 242b, 242c, 242d, which is directly behind the first pair 242a, 242b of the four actuating units 242a as per the view from FIG. 2B, is identical to the first pair 242a, 242b of the four actuating units 242a, 242b, 242c, 242d. Accordingly, it is understood that the following description with regards to the components referenced by numerals for the first pair 242a, 242b of the four actuating units 242a, 242b, 242c, 242d are also applicable to the second pair 242c, 242d of the four actuating units 242a, 242b, 242c, 242d.

According to various embodiments, each actuating unit 242a, 242b, 242c, 242d of the compression actuation mechanism 240 may include a first inverted wedge member 250a, 250b movable relative to the base part 210 along an actuation axis 256a, 256b parallel to the movement axis 232 of the second mold chase 230. According to various embodiments, the first inverted wedge member 250a, 250b may reciprocate back and forth in a linear manner along the actuation axis 256a, 256b. According to various embodiments, the first inverted wedge member 250a, 250b may be oriented with a base 252a, 252b directed towards the second mold chase 230, wherein the base 252a, 252b of the first inverted wedge member 250a, 250b may be perpendicular to the movement axis 232 and a height of the first inverted wedge member 250a, 250b may be parallel to the movement axis 232. According to various embodiments, the first inverted wedge member 250a, 250b may include any suitable wedge shaped. For example, the first inverted wedge member 250a, 250b may include a right-angled-triangular-prism shaped wedge member oriented with a surface of the base 252a, 252b directed towards the second mold chase 230 and a vertical surface 254a, 254b parallel to the movement axis 232. According to various embodiments, when the second mold chase 230 is at the predetermined position and the sliding support blocks 236a, 236b, 236c, 236d are at the second position, the first inverted wedge member 250a, 250b may be moved along the actuation axis 256a, 256b to engage and urge against the corresponding sliding support blocks 236a, 236b, 236c, 236d for moving the second mold chase 230 (for example, see FIG. 3E) towards the first mold chase 220 for cooperatively applying the compression force therebetween. According to various embodiments, the base 252a, 252b of the first inverted wedge member 250a, 250b may engage and urge against the corresponding sliding support block 236a, 236b, 236c, 236d at the second mold chase 230. According to various embodiments, the first inverted wedge member 250a, 250b may be restrained to move only along the actuation axis 256a, 256b. According to various embodiments, the first inverted wedge member 250a, 250b may be coupled to a guide rod or a guide track, which is parallel to the actuation axis 250a, 250b, for moving along the actuation axis 256a, 256b. According to various embodiments, the actuation axis 256a, 256b of each actuating unit 242a, 242b, 242c, 242d may intersect the corresponding sliding support blocks 236a, 236b, 236c, 236d. According to various embodiments, the first inverted wedge member 250a of the first 242a of the at least two actuating units and the first inverted wedge member 250b of the second 242b of the at least two actuating units may be moved by a same distance along respective actuation axis 256a, 256b such that an uniform movement of the second mold chase 230 may be achieved. According to various embodiments, the first inverted wedge member 250a of the first 242a of the at least two actuating units and the first inverted wedge member 250b of the second 242b of the at least two actuating units may be pre-set to be at a different initial height such that an initial orientation of the second mold chase 230 may be tilted. Subsequently, the first inverted wedge member 250a of the first 242a of the at least two actuating units and the first inverted wedge member 250b of the second 242b of the at least two actuating units may be moved by a same distance along respective actuation axis 256a, 256b such that the second mold chase 230 may be uniformly moved in the tilted orientation. According to various embodiments, the first inverted wedge member 250a of the first 242a of the at least two actuating units and the first inverted wedge member 250b of the second 242b of the at least two actuating units may be moved by a different distance along respective actuation axis 256a, 256b such that tilting or levelling or balancing of the second mold chase 230 may be achieved to adjust the degree of parallelism between the first mold chase 220 and the second mold chase 230.

According to various embodiments, each actuating unit 242a, 242b, 242c, 242d may include a second wedge member 260a, 260b movable relative to the first inverted wedge member 250a, 250b along a transmission axis 266a, 266b perpendicular to the movement axis 232 of the second mold chase 230. According to various embodiments, the second wedge member 260a, 260b may reciprocate back and forth in a linear manner along the transmission axis 266a, 266b. According to various embodiments, the second wedge member 260a, 260b may be oriented with a base 262a, 262b directed towards the base part 210, wherein the base 262a, 262b of the second wedge member 260a, 260b may be perpendicular to the movement axis 232 and a height of the second wedge member 260a, 260b may be parallel to the movement axis 232. According to various embodiments, the second wedge member 260a, 260b may include any suitable wedge shaped. For example, as shown in FIG. 2B, the second wedge member 260a, 260b may include a right-angled-triangular-prism shaped wedge member oriented with a surface of the base 262a, 262b directed towards the base part 210 and a vertical surface 264a, 264b parallel to the movement axis 232. According to various embodiments, the second wedge member 260a, 260b may be restrained to move only along the transmission axis 266a, 266b. According to various embodiments, the second wedge member 260a, 260b may be coupled to a guide rod or a guide track, which is parallel to the transmission axis 266a, 266b, for moving along the transmission axis 266a, 266b.

According to various embodiments, each actuating unit 242a, 242b, 242c, 242d may include a drive mechanism 244a, 244b coupled to the second wedge member 260a, 260b to move the second wedge member 260a, 260b along the transmission axis 266a, 266b. According to various embodiments, the drive mechanism 244a, 244b may include a linear actuator such as, but not limited to, an electromechanical linear actuator which converts rotary motion of a motor to a linear motion, a hydraulic actuator, a pneumatic actuator, a linear motor, or a telescoping linear motor. According to various embodiments, the drive mechanism 244a, 244b may move the second wedge member 260a, 260b linearly along the transmission axis 266a, 266b. According to various embodiments, the drive mechanism 244a, 244b may move the second wedge member 260a, 260b based on a drive-control signal. According to various embodiments, the drive mechanisms 244a, 244b of the at least two actuating units 242a, 242b may be independently controlled to drive the second wedge members 260a, 260b respectively to be moved by a different distance. According to various embodiments, the drive mechanisms 244a, 244b of the at least two actuating units 242a, 242b may receive individual drive-control signals respectively, which may be different from each other.

According to various embodiments, in each actuating unit 242a, 242b, 242c, 242d, an inclined surface 258a, 258b of the first inverted wedge member 250a, 250b and an inclined surface 268a, 268b of the second wedge member 260a, 260b may be slidably engaged to each other in a manner so as to convert a motion of the second wedge member 260a, 260b along the transmission axis 266a, 266b to a motion of the first inverted wedge member 250a, 250b along the actuation axis 256a, 256b for moving the second mold chase 230 along the movement axis 232. According to various embodiments, an angle formed between the inclined surface 258a, 258b and the base 252a, 252b of the first inverted wedge member 250a, 250b may be the same as an angle formed between the inclined surface 268a, 268b and the base 262a, 262b of the second wedge member 260a, 260b. According to various embodiments, when the inclined surface 258a, 258b of the first inverted wedge member 250a, 250b and the inclined surface 268a, 268b of the second wedge member 260a, 260b are in sliding contact with each other, the base 252a, 252b of the first inverted wedge member 250a, 250b and the base 262a, 262b of the second wedge member 260a, 260b may be parallel to each other. Further, a thin end 259a, 259b of the first inverted wedge member 250a, 250b whereby the base 252a, 252b and the inclined surface 258a, 258b of the first inverted wedge member 250a, 250b converges may be directed opposite to a direction of the thin end 269a, 269b of the second wedge member 260a, 260b whereby the base 262a, 262b and the inclined surface 268a, 268b of the second wedge member 260a, 260b converges. According to various embodiments, when the second wedge member 260a, 260b is moved along the transmission axis 266a, 266b, the inclined surface 268a, 268b of the second wedge member 260a, 260b, which is at an angle with respect to the transmission axis 266a, 266b, may slide against the inclined surface 258a, 258b of the first inverted wedge member 250a, 250b, which is at an angle with respect to the actuation axis 256a, 256b, to convert the linear motion of the second wedge member 260a, 260b along the transmission axis 266a, 266b into the linear motion of the first inverted wedge member 250a, 250b along the actuation axis 256a, 256b.

According to various embodiments, the compression actuation arrangement 240 may be operable to move the second mold chase 230 towards the first mold chase 220 for cooperatively applying a compression force therebetween. According to various embodiments, by controlling the drive mechanisms 244a, 244b of the at least two actuating units 242a, 242b of the compression actuation arrangement 240 to move the second wedge members 260a, 260b of the at least two actuating units 242a, 242b, respectively, the motions of the second wedge members 260a, 260b of the at least two actuating units 242a, 242b may be converted to the motions of the first inverted wedge members 250a, 250b of the at least two actuating units 242a, 242b, for engaging and urging the second mold chase 230 to move towards the first mold chase 220. Accordingly, the compression actuation arrangement 240 may translate the movement of the second mold chase 230 towards the first mold chase 220 as a compression force for compressing molding materials placed between the second mold chase 230 and the first mold chase 220.

According to various embodiments, the compression molding machine 200 may include a first heating arrangement 280 underneath the first mold chase 220. According to various embodiments, the compression molding machine 200 may include a second heating arrangement 282 on an upper surface of the second mold chase 230. According to various embodiments, the first heating arrangement 280 may be disposed on the first mold chase 220 and directed towards the second mold chase 230. Similarly, the second heating arrangement 282 may be disposed on the second mold chase 230 and directed towards the first mold chase 220. According to various embodiments, each of the first and second heating arrangements 280, 282 may include, but not limited to, a heating plate, a heating film, or a heating wire. According to various embodiments, with the first and second heating arrangements 280, 282 disposed on the first mold chase 220 and the second mold chase 230 respectively, the compression molding machine 200 may be capable of applying heat during molding of materials. According to various embodiments, the first and second heating arrangements 280, 282 may be controlled based on heating-control signals.

According to various embodiments, each of the actuating unit 242a, 242b, 242c, 242d of the compression actuation arrangement 240 may include a force sensor 246a, 246b disposed between the drive mechanism 244a, 244b and the second mold chase 230. According to various embodiments, the force sensor 246a, 246b may be disposed between the second mold chase 230 and the first inverted wedge member 250a, 250b. Accordingly, the force sensor 246a, 246b may be configured to measure a force or pressure or compression directly applied by the first inverted wedge member 250a, 250b to the second mold chase 230. According to various embodiments, the force sensor 246a, 246b may be disposed between the drive mechanism 244a, 244b and the second wedge member 260a, 260b. Accordingly, the force sensor 246a, 246b may be configured to measure a force or pressure or compression directly applied by the drive mechanism 244a, 244b to the second wedge member 260a, 260b as a measure of the force or pressure or compression applied by the actuating unit 242a, 242b, 242c, 242d on the second mold chase 230. According to various embodiments, the force sensor 246a, 246b may be configured to provide a force detection signal indicating the magnitude of the force or pressure or compression detected. According to various embodiments, the force sensor 246a, 246b may include, but not limited to, a load cell, a strain gauge, or a piezoelectric sensor.

According to various embodiments, each of the actuating unit 242a, 242b, 242c, 242d of the compression actuation arrangement 240 may include a position sensor 248a, 248b fixed to the first inverted wedge member 250a, 250b or to the base part 210 for determining a displacement of the first inverted wedge member 250a, 250b with respect to the base part 210 along the actuation axis 256a, 256b. According to various embodiments, when the position sensor 248a, 248b is fixed to the first inverted wedge member 250a, 250b, the position sensor 248a, 248b may measure a distance from the position sensor 248a, 248b to the base part 210 as the first inverted wedge member 250a, 250b, together with the position sensor 248a, 248b, is being moved to determine the displacement of the first inverted wedge member 250a, 250b. According to various embodiments, when the position sensor 248a, 248b is fixed to the base part 210, the position sensor 248a, 248b may measure a distance from the position sensor 248a, 248b to a reference position (e.g. a protrusion or a reference structure) as the first inverted wedge member 250a, 250b, together with the reference position, is being moved to determine the displacement of the first inverted wedge member 250a, 250b. According to various embodiments, the position sensor 248a, 248b may be configured to provide a position detection signal indicating a distance between the first inverted wedge member 250a, 250b and the base part 210, or a displacement of the first inverted wedge member 250a, 250b. According to various embodiments, the position sensor 248a, 248b may include but not limited to a position encoder, a displacement sensor, a proximity sensor, a laser sensor, a light sensor or an ultrasonic sensor.

According to various embodiments, each pair of the at least two actuating units (for example, four actuating units 242a, 242b, 242c, 242d) of the compression actuation arrangement 240 may be arranged to be in mirror symmetry with respect to each other in a manner such that the transmission axes 266a, 266b of the second wedge members 260a, 260b of the pair of actuating units 242a, 242b may be coaxial. Accordingly, the first and second adjacent actuating units 242a, 242b of the first pair of the four actuating units 242a, 242b, 242c, 242d along the first side of the rectangular or square pattern formed by the four actuating units 242a, 242b, 242c, 242d (for example, see FIG. 2A) may be arranged to be in mirror symmetry with respect to each other in a manner such that the transmission axes 266a, 266b of the second wedge members 260a, 260b of the first and second adjacent actuating units are coaxial. Similarly, the third and fourth adjacent actuating units 242c, 242d of the second pair of the four actuating units 242a, 242b, 242c, 242d along the second side of the rectangular or square pattern formed by the four actuating units 242a, 242b, 242c, 242d (for example, see FIG. 2A) may be arranged to be in mirror symmetry with respect to each other in a manner such that the transmission axes of the second wedge members of the third and fourth adjacent actuating units 242c, 242d are coaxial. For example, as shown in FIG. 2B, according to various embodiments, the thin end 259a of the first inverted wedge member 250a of the first actuating unit 242a of the first pair and the thin end 259b of the first inverted wedge member 250b of the second actuating unit 242b of the first pair may be directed away from each other so as to be in mirror symmetry with respect to each other. Further, the thin end 269a of the second wedge member 260a of the first actuating unit 242a of the first pair and the thin end 269b of the second wedge member 260b of the second actuating unit 242b of the first pair may be directed towards each other so as to be in mirror symmetry with respect to each other. According to various embodiments, the orientations of the first inverted wedge members 250a, 250b and the second wedge members 260a, 260b may be reversed. According to various embodiments, arranging each pair of the four actuating units 242a, 242b, 242c, 242d in mirror symmetry may provide an optimal configuration for actuating the four sliding support blocks 236a, 236b, 236c, 236d to tilt or level or balance the second mold chase 230 with respect to the first mold chase 220 for cooperatively applying the compression force therebetween.

According to various embodiments, the compression molding machine 200 may further include a film dispenser unit 290. The film dispenser unit 290 may include a film supply reel 292 coupled to a first side of the first mold chase 220 and a film take-up reel 294 coupled to an opposite second side of the first mold chase 220. Accordingly, the film supply reel 292 and the film take-up reel 294 may be on two opposite sides of the first mold chase 220. According to various embodiments, a film 296 may be suspended between the film supply reel 292 and the film take-up reel 294 across the first heating arrangement 280 at the first mold chase 220. Accordingly, the film 296 may be hanging underneath the first mold chase 220 and across the first heating arrangement 280 at the first mold chase 220. According to various embodiments, the film take-up reel 294 may be actuated such that a used segment of the film 296 may be reeled onto the film take-up reel 294 and a fresh segment of the film 296 may be unreeled from the film supply reel 292. According to various embodiments, the film take-up reel 294 may be operated based on a reel-control signal. According to various embodiments, the film 296 may facilitate separation of a molded panel from the first mold chase 220.

According to various embodiments, the compression molding machine 200 may further include a film suction arrangement 284 disposed underneath the first mold chase 220. According to various embodiments, the film suction arrangement 284 may be operable to adhere the film 296 to the first heating arrangement 280 at the first mold chase 220. According to various embodiments, the film suction arrangement 284 may include one or more vacuum suction ports operable to adhere the film 296 to the first heating arrangement 280. According to various embodiments, the one or move vacuum suction ports of the film suction arrangement 284 may be disposed in the first heating arrangement 280. According to various embodiments, the film suction arrangement 284 may be configured to fix the film 296 to the first heating arrangement 280. According to various embodiments, the film suction arrangement 284 may also be configured to flatten the film 296 on the first heating arrangement 280. According to various embodiments, the vacuum suction arrangement 284 may be operated based on a vacuum-control signal.

According to various embodiments, the compression molding machine 200 may further include a carrier attachment arrangement 286 disposed at the second mold chase 230. According to various embodiments, the carrier attachment arrangement 286 may be configured to hold or retain a carrier to the second heating arrangement 282 at the second mold chase 230. According to various embodiments, the carrier attachment arrangement 286 may be configured to fix the carrier on the second mold chase 230. According to various embodiments, the carrier attachment arrangement 286 may be configured to prevent shifting of the carrier during the molding process. According to various embodiments, the carrier attachment arrangement 286 may prevents the carrier from being lifted to contact the first mold chase 220. According to various embodiments, the carrier attachment arrangement 286 may enable uniform heating of the carrier by the second heating arrangement 282 at the second mold chase 230. According to various embodiments, the carrier attachment arrangement 286 may include one or more or a combination of vacuum suction elements, magnetic elements, or gripping elements for attaching the carrier to the second heating arrangement 282 at the second mold chase 230. According to various embodiments, the carrier may be carrying a plurality of electronic elements to be molded or encapsulated. According to various embodiments, the vacuum suction elements may be vacuum suction ports or pads or cups, the magnetic elements may be electromagnets or permanent magnets, and the gripping elements may be a pair of clamps, jaws or grippers. According to various embodiments, the carrier attachment arrangement 286 may be operated based on an attachment-control signal.

According to various embodiments, the compression molding machine 200 may include a seal around a peripheral portion or a perimeter of the first heating arrangement 280 at the first mold chase 220 or the second heating arrangement 282 at the second mold chase 230 or both. Accordingly, when the second mold chase 230 is urging against the first mold chase 220 during compression molding, the seal, the first mold chase 220 and the second mold chase 230 may form an enclosed molding chamber. According to various embodiments, the second mold chase 230 may include a vacuum port. The vacuum port of the second mold chase 230 may be operable to remove air in the enclosed molding chamber so as to form a void free molding environment. Accordingly, the seal and the vacuum port may reduce the chance of air entrapment during molding and ensure that the molded panel is completely filled without voids.

According to various embodiments, there is provided the compression molding machine 200. According to various embodiments, the compression molding machine 200 may include two mold chase, namely, a first mold chase 220 (or a top chase) and a second mold chase 230 (or a bottom chase). According to various embodiments, the compression molding machine 200 may include the film dispenser unit 290 (or a tape feeder) for dispensing a plastic film 296 to separate the molding materials (or molding compounds) from the first mold chase 220 (or the top chase) of the compression molding machine 200 during a molding process. According to various embodiments, the film dispenser unit 290 may include the film supply reel 292 (or an inlet feeder) for providing a fresh film before molding and the film take-up reel (or the outlet feeder) for receiving a used film after molding. According to various embodiments, the compression molding machine 200 may include two heating arrangements (or two hot plates). The two heating arrangements may include the first heating arrangement 280 (or top hot plate) beneath the first mold chase 220 (or the top chase) and a second heating arrangement 282 (or bottom hot plate) on the second mold chase 230 under the first heating arrangement 280 (or the top hot plate). According to various embodiments, the first heating arrangement 280 and the second heating arrangement 282 when pressed together may form a molding chamber where a plurality of electronic elements may be molded on a carrier or substrate in the form of a panel.

According to various embodiments, the compression molding machine 200 may include four sliding support blocks 236a, 236b, 236c, 236d (or four slide blocks) for supporting the second mold chase 230 at each corner. The four sliding support blocks 236a, 236b, 236c, 236d may include a first sliding support block 236a at the front left corner, a second sliding support block 236b at the front right corner, a third sliding support block 236c at the back left corner, and a fourth sliding support block 236d at the back right corner. According to various embodiments, the compression molding machine 200 may include four force sensors (only two force sensors 246a, 246b are shown in FIG. 2B) or four load cells for reading pressures at each corner at different times. The four force sensors 246a, 246b may include a first force sensor 246a (or first load cell) at the front left corner, a second force sensor 246b (or second load cell) at the front right corner, a third force sensor (or third load cell) at the back left corner and a fourth force sensor (or fourth load cell) at the back right corner.

According to various embodiments, the compression molding machine 200 may include the secondary actuation arrangement 270 (or a twin vertical/Z-direction screw drive) for fast closure of the first and second mold chase 220, 230. According to various embodiments, the compression molding machine 200 may include the compression actuation arrangement 240 including the four actuating units 242a, 242b, 242c, 242d (or four wedge drives) at each corner beneath corresponding force sensors 246a, 246b (or load cells). According to various embodiments, each actuating unit 242a, 242b, 242c, 242d (or each wedge drive) may include a first inverted wedge member 250a, 250b (or vertical/Z-direction wedge) and a second wedge member 260a, 260b (or a horizontal/X-direction wedge). According to various embodiments, the first actuating unit 242a (or first wedge drive) may at the front left corner, the first actuating unit 242a having a first inverted wedge member 250a and a second wedge member 260a. According to various embodiments, the second actuating unit 242b (or second wedge drive) may at the front right corner, the second actuating unit 242b having a first inverted wedge member 250b and a second wedge member 260b. According to various embodiments, the third actuating unit 242c (or third wedge drive) may at the back left corner, the third actuating unit 242c having a first inverted wedge member and a second wedge member. According to various embodiments, the fourth actuating unit 242d (or first wedge drive) may at the back right corner, the fourth actuating unit 242d having a first inverted wedge member and a second wedge member. According to various embodiments, the compression molding machine 200 may include position sensors 248a, 248b (or vertical/Z-direction encoder).

According to various embodiments, the four actuating units 242a, 242b, 242c, 242d (or the four wedge drives) may be one of the unique feature of the compression molding machine 200. According to various embodiments, the four independent actuating units 242a, 242b, 242c, 242d (or the four independent wedge drives) may move the second mold chase 230 to achieve the required parallelism for panel level package in a large scale molding process. Further, excellent height control and high degree of parallelism (+/−25 um) may be achieved. According to various embodiments, the four independent actuating units 242a, 242b, 242c, 242d (or the four independent wedge drives) may enable fine motion. According to various embodiments, motion may be interpolated to finer counts, since a number of units of motion in the X-direction may be transmitted into a single unit of movement in the Z-direction. More particularly, the number of units of motion in the X-direction may be determined by the specific wedge angle. According to various embodiments, the compression molding machine 200 may be capable of providing high tonnage (320 TF Clamp capacity) with the four actuating units 242a, 242b, 242c, 242d (or the four wedge drives). According to various embodiments, the four actuating units 242a, 242b, 242c, 242d (or the four wedge drives) may amplify the input force. According to various embodiments, the four actuating units 242a, 242b, 242c, 242d (or the four wedge drives) may allow excellent force control of compression. According to various embodiments, the moving distance may have a linear relationship with the input and output force, which may allow the operator to control the pressure to an appropriate value more easily and accurately during operation. According to various embodiments, the four actuating units 242a, 242b, 242c, 242d (or the four wedge drives) may provide the best cost of ownership. According to various embodiments, due to the structure may be relatively simpler, the maintenance cost may be cheaper. In addition, the pressure may be small for each of the four actuating units 242a, 242b, 242c, 242d (or the four wedge drives). Further, the pressure may no longer be loaded onto the secondary actuation arrangement 270 (or the ball screw), and the lifespan of the secondary actuation arrangement 270 (or the ball screw) may thus be increased. Accordingly, the four actuating units 242a, 242b, 242c, 242d (or the four wedge drives) may increase the screw life of the ball screw. In addition, the compression molding machine 200 may achieve a quick closure of the mold by utilizing the secondary actuation arrangement 270 (or the ball screw drive device). More specifically, the secondary actuation arrangement 270 with the two linear actuators 272a, 272b (or the two ball screws) may be used for accurately controlling the parallel precision enabling a fast closure, and fine clamping at each of the four sides.

According to various embodiments, the four force sensors 246a, 246b (or four load cells) and the four position sensors 248a, 248b (or the four vertical/Z-direction encoders) may be another unique feature of the compression molding machine 200. According to various embodiments, the four force sensors 246a, 246b (or four load cells) may be for reading pressures at each corner at different times. According to various embodiments, each of the four position sensors 248a, 248b (or the four vertical/Z-direction encoders) may correspond to a rising value of the first inverted wedge member 250a, 250b (or a wedge) in the Z direction (i.e. the height direction). Various embodiments may auto adjust to a variation in thickness of the carrier by the position sensors 248a, 248b (or the vertical/Z-direction encoder) to the default setting with a value of compensation. According to various embodiments, a barcode on the carrier may be used for recording the information of the carrier and the molded panel (the product). The carrier information may include the variation in thickness of the carrier. After the compression molding machine 200 reads the variation in thickness of the carrier, the position sensors 248a. 248b (or the vertical/Z-direction encoder) may be used to adjust the movement of the second mold chase 230 to auto adjust tilting of the carrier. According to various embodiments, the thickness of the molding layer may also be adjusted according to specific requirements of the molded panel (or product) by applying the position sensors 248a, 248b (or the vertical/Z-direction) encoder to the default setting. According to various embodiments, the pressure may also be altered for adjusting the thickness of the molding layer or the molded panel (or product).

According to various embodiments, the compression molding machine 200 may include four sets of vacuuming systems serving as the film suction arrangement 284, the carrier attachment arrangement 286, and for evacuating the molding chamber. According to various embodiments, the vacuuming systems serving as the carrier attachment arrangement 286 (or carrier vacuum) and the vacuuming systems for evacuating the molding chamber may be in the second heating arrangement 282 (or lower hot plate) at the second mold chase 230. According to various embodiments, the vacuuming systems serving as the film suction arrangement 284, which include a first suction sub-arrangement serving as film absorb vacuum and a second suction sub-arrangement serving as film flat vacuum, may be in the first heating arrangement 280 (or upper hot plate) at the first mold chase 220. According to various embodiments the vacuuming systems serving as the carrier attachment arrangement 286 (or the carrier vacuum) may be used to fix the carrier on the second mold chase 230. Accordingly, it may prevent shifting of the carrier during the molding process. It may also prevent carrier from lifting and touching the first mold chase 220 (or the top mold). Hence, heating of the carrier may be more uniform. According to various embodiments, the air originally in the molding chamber may be removed by the vacuuming systems for evacuating the molding chamber for forming a void free molding environment. Accordingly, it may reduce the chance of air entrapment in the cavity and may make sure that the molded panel may be completely filled. According to various embodiments, the film absorb vacuum of the film suction arrangement 284 may be configured to absorb and fix the film in the first heating arrangement 280 (or the upper hot plate). According to various embodiments, the film flat vacuum of the film suction arrangement 284 may be configured to make the film flat on the first heating arrangement 280 (or the upper hot plate). According to various embodiments, the compression molding machine 200 may include the film dispensing unit 290 (or the tape feeder) to feed fresh film into the molding chamber.

FIG. 3A to FIG. 3H show a series of schematic drawings illustrating a method of compression molding using the compression molding machine 200 of FIG. 2B according to various embodiments.

According to various embodiments, as shown in FIG. 3A, the film dispensing unit 290 (or the tape feeder) may be turned on or activated to provide a fresh film 296 onto a bottom surface of the first heating arrangement 280 (or the top hot plate) at the first mold chase 220. According to various embodiments, the film dispensing unit 290 may be a tape roller indexes. Accordingly, the method may include dispensing the fresh film 296 by the film dispensing unit 290 in a manner so as to suspend the fresh film 296 between the film supply reel 292 and the film take-up reel 294 and across the first heating arrangement 280 at the first mold chase 220. According to various embodiments, after the fresh film 296 is provided, the film suction arrangement 284 (or the film absorb vacuum and the film flat vacuum) may be turned on to absorb and fix the fresh film 296 to the first heating arrangement 280 (or the upper hot plate) and also make the fresh film 296 flat on first heating arrangement 280 (or the upper hot plate). Accordingly, the method may include operating the film suction arrangement 284 to adhere the first film 296 to the first heating arrangement 280 at the first mold chase 220.

According to various embodiments, as shown in FIG. 3B, a carrier 202 (or a panel level substrate) having a plurality of electronic elements 204 (or dies) thereon may be provided. According to various embodiments, the molding material 206 (or molding compound) may also be provided onto and fully covering the carrier 202 (or the panel level substrate). According to various embodiments, the carrier 202 (or the panel level substrate) may be loaded on the second heating arrangement 282 (or the bottom hot plate) at the second mold chase 230. Accordingly, the method may include loading the carrier 202 with the plurality of electronic elements 204 and the molding material 206 thereon on the second heating arrangement 282 (or the bottom hot plate) at the second mold chase 230. According to various embodiments, the carrier attachment arrangement 286 (or the carrier vacuum) may be turned on or activated to hold or retain the carrier 202 on the second heating arrangement 282 at the second mold chase 230. Accordingly, the method may include attaching, via the carrier attachment arrangement 286, the carrier to the second heating arrangement 282 at the second mold chase 230.

According to various embodiments, as shown in FIG. 3C, the second mold chase 230 may be moved upward to the predetermined position (or a certain height) using the secondary actuation arrangement 270 (or the two screw drives). According to various embodiments, a molding chamber may be formed by closing the second heating arrangement 282 (or the bottom hot plate) at the second mold chase 230 and the first heating arrangement 280 (or the top hot plate) at the first mold chase 220. However, no compression pressure is applied at this point. According to various embodiments, the vacuuming system for evacuating the molding chamber may be turned on or activated. Accordingly, the method may include moving, via the secondary actuation arrangement 270, the second mold chase 230 to the predetermined position along the movement axis 232. Further, moving the second mold chase 230 may include controlling the at least one linear actuator 272a, 272b to move the second mold chase 230 to the predetermined position, which is above the compression actuation arrangement 240.

According to various embodiments, as shown in FIG. 3D, the four sliding support blocks 236a, 236b, 236c, 236d (or slide blocks) may be moved inwards beneath the second mold chase 230 in order to firstly support the second mold chase 230 when pressing the second mold chase 230 by using the four actuating units 242a, 242b, 242c, 242d (or the four wedge drive), and secondly ensure that the second heating arrangement 282 (or the bottom hot plate) at the second mold chase 230 is exactly parallel to the first heating arrangement 280 (or top hot plate) at the first mold chase 220. Accordingly, the method may further include moving the at least two sliding support blocks (for example, the four sliding support blocks 236a, 236b, 236c, 236d), or each pair of the four sliding support blocks, at the second mold chase 230 to slide towards each other and position above the at least two actuating units (for example, the four actuating units 242a, 242b, 242c, 242d), or each corresponding pair of the four actuating units, of the compression actuation arrangement 240 respectively.

Figure 3E:
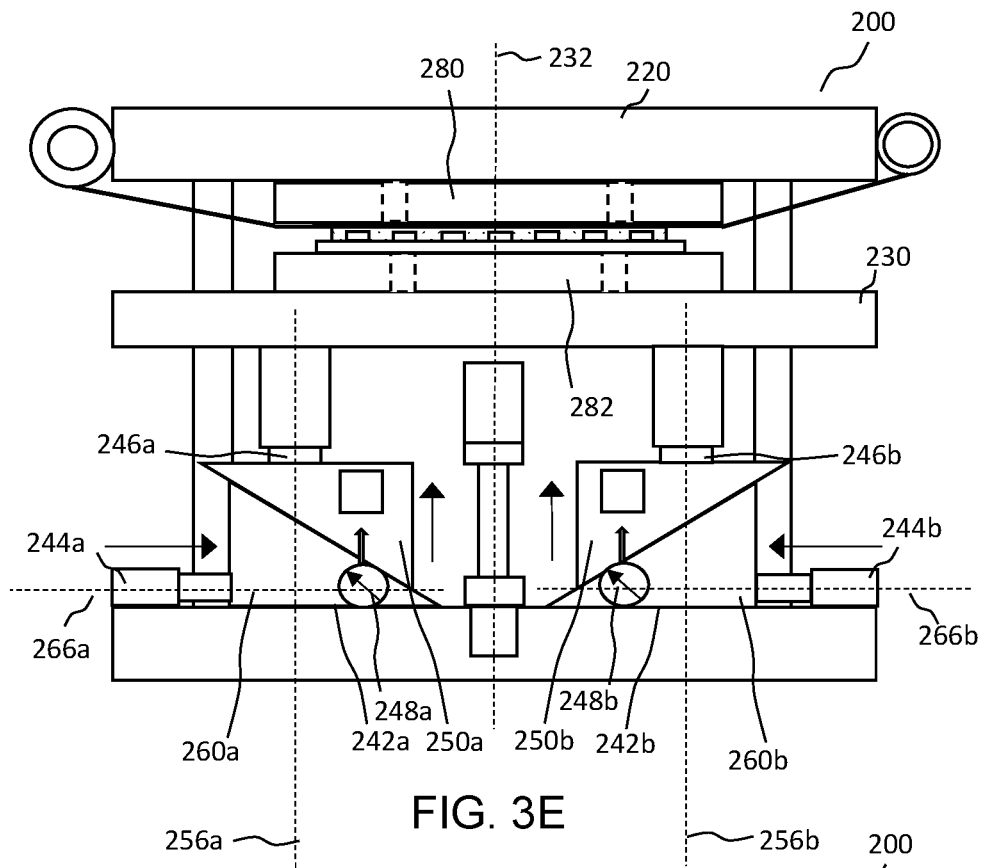

According to various embodiments, as shown in FIG. 3E, the four actuating units 242a, 242b, 242c, 242d (or the four wedge drives) may be actuated inwards to provide compression forces for molding. According to various embodiments, the four actuating units 242a, 242b, 242c, 242d (or the four wedge drives) may apply a pressure on the second mold chase 230 (or the bottom hot plate) according to pre-set parameters. Particularly, in each of the four actuating units 242a, 242b, 242c, 242d (or the four wedge drives), the second wedge member 260a, 260b (or the horizontal/X-direction wedge) may be moved along the transmission axis 266a, 266b (or in a horizontal direction) driven by the drive mechanism 244a, 244b, (or a motor and a transmission mechanism), and the first inverted wedge member 250a, 250b (or the vertical/Z-direction wedge) may be moved along the actuation axis 256a, 256b (in a Z-direction) as a result of the movement of the second wedge member 260a, 260b (or the horizontal/X-direction wedge). According to various embodiments, each of the four corners of the second heating arrangement 282 (or the bottom hot plate) may be driven by the first inverted wedge member 250a, 250b (or the vertical/Z-direction wedge), and may move along the actuation axis 256a, 256b (or in the Z-direction) according to the pre-set parameters programmed in position sensor 248a, 248b (or the Z-encoder) including a moving speed such as 0.35 mm/s. According to various embodiments, the first inverted wedge members 250a, 250b of the four actuating units 242a, 242b, 242c, 242d (or the four wedge drives) may move at a same speed to ensure that the four corners of the second heating arrangement 282 (or the bottom hot plate) may move along the movement axis 232 (or in the Z-direction) at a same distance at any time. Therefore, the second heating arrangement 282 (or the bottom hot plate) at the second mold chase 230 may be made parallel with the first heating arrangement 280 (or the upper hot plate) at the first mold chase 220 during the molding process. According to various embodiments, each of the four force sensors 246a, 246b (or the load cells) may measure the pressure applied by one of the four actuating units 242a, 242b, 242c, 242d (or the four wedge drives) respectively. According to various embodiments, when the sum of the four pressures reaches the pre-set pressure value, the pressurization process may be stopped, and a timing may be started for a subsequent molding process. According to various embodiments, a timer may be started for monitoring or tracking or counting compression time once the compression force reaches the pre-set point.

Accordingly, the method may include moving, via the compression actuation arrangement 240, the second mold chase 230 towards the first mold chase 220 along the movement axis 232 for cooperatively applying the compression force therebetween. According to various embodiments, moving the second mold chase 230 towards the first mold chase 220 may include moving the second wedge member 260a, 260b of each actuating unit 242a, 242b, 242c, 242d, inwards by operating the drive mechanism 244a, 244b of each actuating unit 242a, 242b, 242c, 242d, along the transmission axis 266a, 266b respectively to move the first inverted wedge member 250a, 250b of each actuating unit 242a, 242b, 242c, 242d upwards along the actuation axis 256a, 256b respectively in a manner so as to actuate the second mold chase 230 to move along the movement axis 232 towards the first mold chase 220 for cooperatively applying the compression force therebetween. The method may further include controlling the drive mechanism 244a, 244b to move the second wedge member 260a, 260b of each actuating unit 242a, 242b, 242c, 242d based on a determined displacement of the first inverted wedge member 250a, 250b of each actuating unit 242a, 242b, 242c, 242d with respect to the base part 210 along the actuation axis 256a, 256b from the position sensor 248a, 248b to match a pre-set value. The method may further include controlling the drive mechanism 244a, 244b to cease moving the second wedge member 260a, 260b of each actuating unit 242a, 242b, 242c, 242d based on a force measurement by the force sensor 246a, 246b reaching a pre-set value. The method may further include maintaining the second mold chase 230 and the first mold chase 220, via the compression actuation arrangement 240, in a state for cooperatively applying the compression force therebetween for a predetermined period of time when the compression force is at the pre-set value.

Figure 3F:
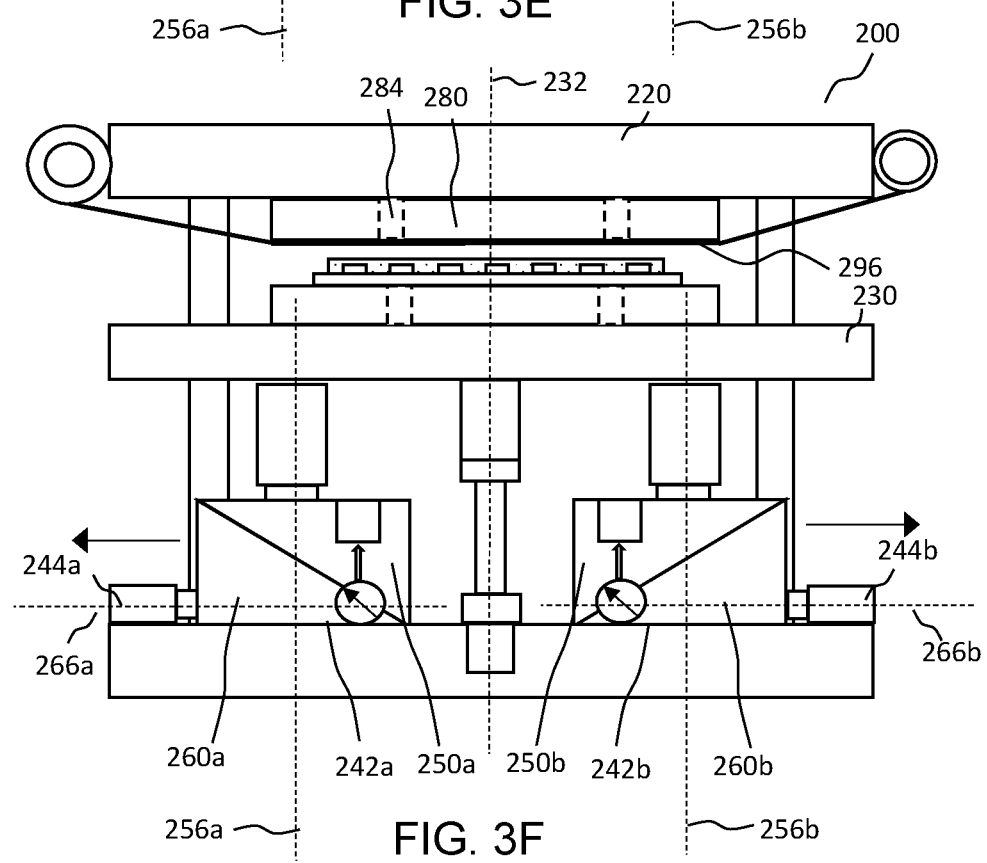

According to various embodiments, as shown in FIG. 3F, when the compression molding is completed, the four actuating units 242a, 242b, 242c, 242d (or the four wedge drives) may be retracted outwards. According to various embodiments, prior to retracting the four actuating units 242a, 242b, 242c, 242d (or the four wedge drives), the vacuuming system for evacuating the molding chamber may be turned off and the film flat vacuum of the film suction arrangement 284 may be turned off. Further, air purging may be started in the molding chamber. According to various embodiments, upon completion of the retraction of the four actuating units 242a, 242b, 242c, 242d (or the four wedge drives), air purging may cease. Accordingly, the method may include ceasing the operation of the film suction arrangement 284 to release the first film 296 to the first heating arrangement 280 at the first mold chase 220. The method may further include moving, via retracting the compression actuation arrangement 240, the second mold chase 230 away from the first mold chase 220 along the movement axis 232 for releasing the compression force therebetween. Further, moving the second mold chase 230 away from the first mold chase 220 may include moving and retracting the second wedge member 260a, 260b of each actuating unit 242a, 242b, 242c, 242d, by operating the drive mechanism 244a, 244b of each actuating unit 242a, 242b, 242c, 242d for retracting along the transmission axis 266a, 266b respectively to move and retract the first inverted wedge member 250a, 250b of each actuating unit 242a, 242b, 242c, 242d along the actuation axis 256a, 256b respectively in a manner so as to make the second mold chase 230 to move along the movement axis 232 away from the first mold chase 220. The method may further include activating air purging in the mold chamber during retraction of the compression actuation arrangement 240. Air purging may include introducing air into the mold chamber to depressurize the chamber.

Figure 3G:
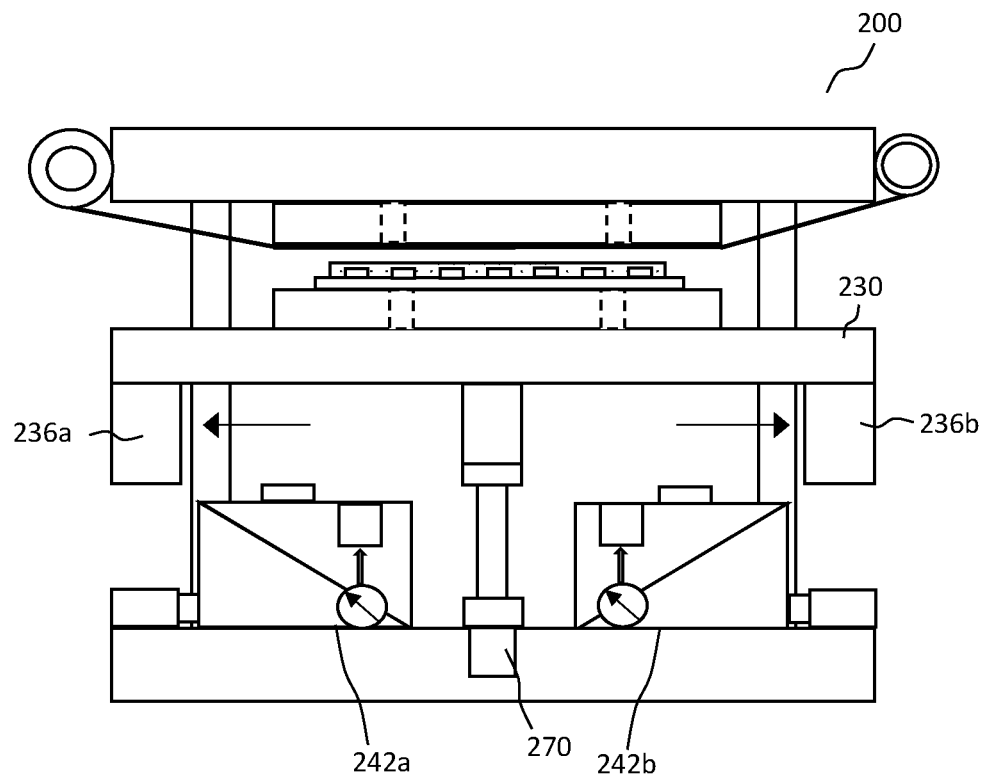

According to various embodiments, as shown in FIG. 3G, after the retraction of the compression actuation arrangement 240, the second mold chase 230 may be supported and held by the secondary actuation arrangement 270. Subsequently, the four sliding support blocks 236a, 236b, 236c, 236d (or the four slide blocks) may be retracted outwards. Accordingly, the method may include moving the at least two sliding support blocks (for example, the four sliding support blocks 236a, 236b, 236c, 236d), or each pair of the four sliding support blocks, at the second mold chase 230 to slide away from each other and position outside the footprint of the at least two actuating units (for example, the four actuating units 242a, 242b, 242c, 242d), or each corresponding pair of the four actuating units 242a, 242b, 242c, 242d, of the compression actuation arrangement 240 respectively.

Figure 3H:
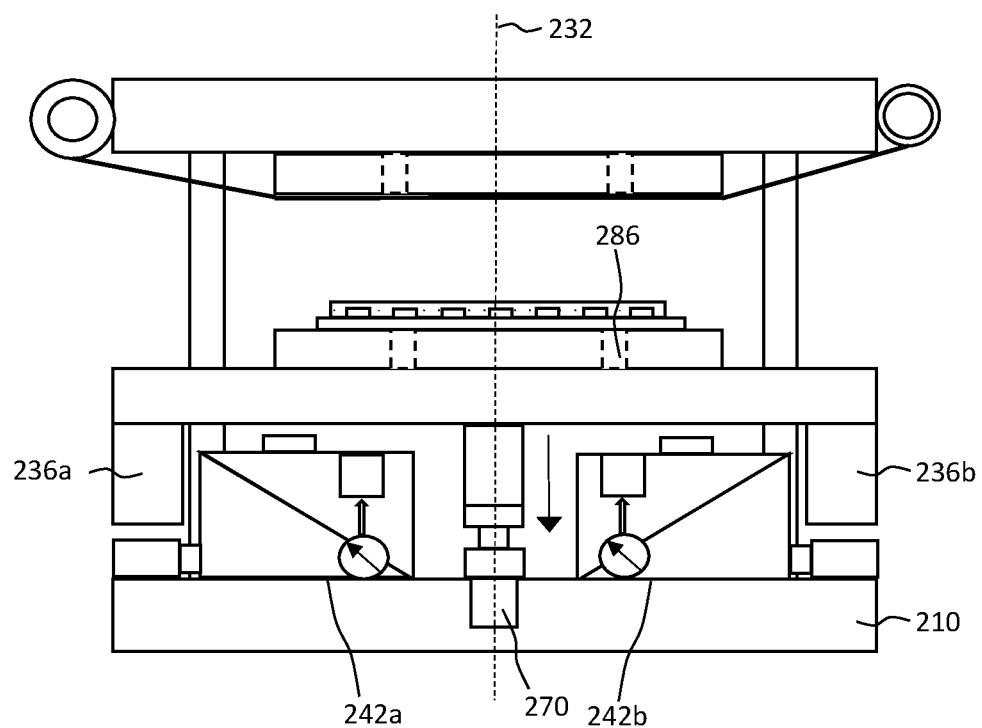

According to various embodiments, as shown in FIG. 3H, with the sliding support blocks 236a, 236b, 236c, 236d moved outside the footprint of the at least two actuating units (for example, the four actuating units 242a, 242b, 242c, 242d), or each corresponding pair of the four actuating units, of the compression actuation arrangement 240, the second mold chase 230 may be lowered towards the base part 210 by the secondary actuation arrangement 270. After the second mold chase 230 is lowered, the carrier attachment arrangement 286 may be turned off and the carrier with the molded panel may be removed from the machine. Accordingly, the method may include moving, via the secondary actuation arrangement 270, the second mold chase 230 towards the base part 210 along the movement axis 232. The method may further include turning off or deactivating the carrier attachment arrangement 286 to release the carrier with the molded panel.

According to various embodiments, the compression molding machine 100, 200 may include a processor. In various embodiments, a "processor" may be understood as any kind of a logic implementing entity, which may be special purpose circuitry or a processor executing software stored in a memory, firmware, or any combination thereof. Thus, in an embodiment, a "processor" may be a hard-wired logic circuit or a programmable logic circuit such as a programmable processor, e.g. a microprocessor (e.g. a Complex Instruction Set Computer (CISC) processor or a Reduced Instruction Set Computer (RISC) processor). A "processor" may also be a processor executing software, e.g. any kind of computer program, e.g. a computer program using a virtual machine code such as e.g. Java. Any other kind of implementation of the respective functions which will be described in more detail below may also be understood as a "processor" in accordance with various embodiments. In various embodiments, the processor may be part of a computing system or a controller or a microcontroller or any other system providing a processing capability. According to various embodiments, such systems may include a memory which is for example used in the processing carried out by the device or system. A memory used in the embodiments may be a volatile memory, for example a DRAM (Dynamic Random Access Memory) or a non-volatile memory, for example a PROM (Programmable Read Only Memory), an EPROM (Erasable PROM), EEPROM (Electrically Erasable PROM), or a flash memory, e.g., a floating gate memory, a charge trapping memory, an MRAM (Magneto-resistive Random Access Memory) or a PCRAM (Phase Change Random Access Memory).

According to various embodiments, the processor may be configured to generate the various control signals, such as drive-control signal, actuation-control signal, heating-control signal, attachment-control signal, reel-control signal, vacuum-control signal, etc. for operating the various components of the respective compression molding machine 100, 200. According to various embodiments, the processor may be configured to generate the various control signals so as to operate the respective compression molding machine 100, 200 in accordance to the various methods as described herein. According to various embodiments, the processor may be configured to generate the various control signals in a pre-determined sequence based on the various methods as described herein. According to various embodiments, the processor may receive the various detection signals from the various components (such as the force sensors 146a, 146b, 246a, 246b and/or the position sensors 148a, 148b, 248a, 248b), process the various detection signals, and generate corresponding control signals in response to the various detection signals for controlling various components of the respective compression molding machine 100, 200.

The following examples pertain to various embodiments.

Example 1 is a compression molding machine, including:
a first mold chase;
a second mold chase opposed to the first mold chase; and
a compression actuation arrangement comprising at least two actuating units for moving the second mold chase towards the first mold chase,
wherein each of the at least two actuating units comprises a first inverted wedge member and a second wedge member movable relative to the first inverted wedge member.

In Example 2, the subject matter of Example 1 may optionally include
a base part,
wherein the first mold chase is fixed in a position spaced apart from the base part so as to be suspended above the base part.
wherein the second mold chase is disposed between the base part and the first mold chase, the second mold chase being movable relative to the base part and the first mold chase along a movement axis, whereby the movement axis extends perpendicularly between the base part and the first mold chase
wherein the compression actuation arrangement is disposed between the second mold chase and the base part for moving the second mold chase along the movement axis,
wherein the at least two actuating units are disposed to independently engage at least two different portions of the second mold chase respectively, wherein the first inverted wedge member is movable relative to the base part along an actuation axis parallel to the movement axis of the second mold chase, wherein the second wedge member is movable relative to the first inverted wedge member along a transmission axis perpendicular to the movement axis of the second mold chase, wherein each actuating unit comprises a drive mechanism coupled to the second wedge member to move the second wedge member along the transmission axis, wherein an inclined surface of the first inverted wedge member and an inclined surface of the second wedge member are slidably engaged to each other in a manner so as to convert a motion of the second wedge member along the transmission axis to the motion of the first inverted wedge member along the actuation axis for moving the second mold chase along the movement axis, whereby the compression actuation arrangement is operable to move the second mold chase towards the first mold chase for cooperatively applying a compression force therebetween In Example 3, the subject matter of Example 2 may optionally include that each actuating unit may include a force sensor disposed between the drive mechanism and the second mold chase for measuring a force applied to the second mold chase by the drive mechanism In Example 4, the subject matter of Example 2 or 3 may optionally include that each actuating unit may include a position sensor fixed to the first inverted wedge member or to the base part for determining a displacement of the first inverted wedge member with respect to the base part along the actuation axis.

In Example 5, the subject matter of any one of Examples 2 to 4 may optionally include that the at least two actuating units may be arranged to be in mirror symmetry with respect to each other in a manner such that the transmission axes of the second wedge members of the at least two actuating units are coaxial.

In Example 6, the subject matter of Example 1 may optionally include a secondary actuation arrangement configured to engage the second mold chase for moving the second mold chase towards the first mold chase.

In Example 7, the subject matter of Example 2 may optionally include a secondary actuation arrangement configured to engage the second mold chase for moving the second mold chase towards the first mold chase, wherein the secondary actuation arrangement may include at least one linear actuator coupled to the base part, the at least one linear actuator having a linearly actuated arm to engage and move the second mold chase along the movement axis, wherein the compression molding machine may include at least two sliding support blocks underneath the second mold chase and slidable relative to the second mold chase along a sliding axis perpendicular to the movement axis of the second mold chase, wherein the secondary actuation arrangement may be operable to move the second mold chase to a predetermined position above the compression actuation arrangement in a manner so as to allow the at least two sliding support blocks to slide towards each other and position above the first inverted wedge members of the compression actuation arrangement respectively, wherein the compression actuation arrangement may subsequently be operable to move the first inverted wedge members of the at least two actuating units to engage the at least two sliding support blocks respectively so as to move the second mold chase along the movement axis towards the first mold chase for cooperatively applying the compression force therebetween.

In Example 8, the subject matter of Example 7 may optionally include that the compression actuation arrangement may include four actuating units disposed to form a rectangular or square pattern with each actuating unit being disposed at a corner of the rectangular or square pattern to independently actuate four different portions of the second mold chase respectively.

In Example 9, the subject matter of Example 8 may optionally include that first and second adjacent actuating units of the four actuating units along a first side of the rectangular or square pattern may be arranged to be in mirror symmetry with respect to each other in a manner such that the transmission axes of the second wedge members of the first and second adjacent actuating units are coaxial, and that third and fourth adjacent actuating units of the four actuating units along a second side of the rectangular or square pattern may be arranged to be in mirror symmetry with respect to each other in a manner such that the transmission axes of the second wedge members of the third and fourth adjacent actuating units are coaxial, wherein the first side and the second side of the rectangular or square pattern are two opposite sides of the rectangular or square pattern.

In Example 10, the subject matter of Example 9 may optionally include that the secondary actuation arrangement may include two linear actuators, wherein a first of the two linear actuators may be disposed outside the first side of the rectangular or square pattern, wherein a second of the two linear actuators may be disposed outside the second side of the rectangular or square pattern, and wherein the two linear actuators may be operable in a synchronous manner to move the second mold chase to the predetermined position above the compression actuation arrangement.

In Example 11, the subject matter of Example 10 may optionally include that each of the two linear actuators may include a screw type linear actuator.

In Example 12, the subject matter of any one of Examples 7 to 11 may optionally include that each actuating unit may include a force sensor disposed between the drive mechanism and the second mold chase for measuring a force applied to the second mold chase by the drive mechanism.

In Example 13, the subject matter of any one of Examples 7 to 12 may optionally include that each actuating unit may include a position sensor fixed to the first inverted wedge member or to the base part for determining a displacement of the first inverted wedge member with respect to the base part along the actuation axis.

In Example 14, the subject matter of any one of Examples 1 to 13 may optionally include a first heating arrangement underneath the first mold chase, and a second heating arrangement on an upper surface of the second mold case.

In Example 15, the subject matter of Example 14 may optionally include a film dispenser unit disposed at the first mold chase, the film dispenser may include a film supply reel coupled to a first side of the first mold chase, and a film take-up reel coupled to an opposite second side of the first mold chase, wherein a film is suspended between the film supply reel and the film take-up reel across the first heating arrangement at the first mold plate.

In Example 16, the subject matter of Example 15 may optionally include a film suction arrangement disposed at the first heating arrangement, the film suction arrangement including one or more vacuum suction ports operable to adhere the film to the first heating arrangement.

In Example 17, the subject matter of any one of Examples 14 to 16 may optionally include a carrier attachment arrangement disposed at the second heating arrangement, the carrier attachment arrangement including one or more vacuum suction elements, magnetic elements, or gripping elements for attaching a carrier to the second heating arrangement at the second mold chase, wherein the carrier is carrying a plurality of electronic elements to be molded.

Example 18 is a compression molding machine, including
a first mold chase;
a second mold chase opposed to the first mold chase;
a compression actuation arrangement for moving the second mold chase towards the first mold chase to cooperatively apply a compression force therebetween, the compression actuation arrangement comprising an actuating unit, the actuating unit comprising a first inverted wedge member and a second wedge member movable relative to the first inverted wedge member; and
a secondary actuation arrangement configured for moving the second mold chase towards the first mold chase to a predetermined position above the compression actuation arrangement.

In Example 19, the compression molding machine of Example 18 may optionally include that the compression actuation arrangement includes at least two actuating units, and that the at least two actuating units may be arranged to be in mirror symmetry with respect to each other in a manner such that transmission axes of the second wedge members of the at least two actuating units are coaxial.

Example 20 is a method of compression molding, including
moving, via a compression actuation arrangement, a second mold chase towards a first mold chase,
wherein the second mold chase is opposed to the first mold chase,
wherein the compression actuation arrangement comprises at least two actuating units, each actuating unit comprising a first inverted wedge member, and a second wedge member movable relative to the first inverted wedge member.

In Example 21, the subject matter of Example 20 may optionally include moving, via a secondary actuation arrangement, the second mold chase towards the first mold chase to a predetermined position prior to moving, via the compression actuation arrangement, the second mold chase towards the first mold chase for cooperatively applying the compression force therebetween.

Example 22 is a method of compression molding, including
moving, via a compression actuation arrangement, a second mold chase towards a first mold chase along a movement axis for cooperatively applying a compression force therebetween,
wherein the second mold chase is disposed between a base part and a first mold chase, the first mold chase being fixed in a position spaced apart from the base part so as to be suspended above the base part, and the second mold chase being movable relative to the base part and the first mold chase along a movement axis extending perpendicularly between the base part and the first mold chase,
wherein the compression actuation arrangement is disposed between the second mold chase and the base part for moving the second mold chase along the movement axis, the compression actuation arrangement including
at least two actuating units disposed to independently actuate at least two different portions of the second mold chase respectively, each actuating unit includes
a first inverted wedge member movable relative to the base part along an actuation axis parallel to the movement axis of the second mold chase,
a second wedge member movable relative to the first inverted wedge member along a transmission axis perpendicular to the movement axis of the second mold chase, wherein an inclined surface of the first inverted wedge member and an inclined surface of the second wedge member are slidably engaged to each other in a manner so as to convert a motion of the second wedge member along the transmission axis to a motion of the first inverted wedge member along the actuation axis for moving the second mold chase along the movement axis, and
a drive mechanism coupled to the second wedge member to move the second wedge member along the transmission axis,
wherein moving, via the compression actuation arrangement, the second mold chase towards the first mold chase includes moving the second wedge member of each actuating unit, by operating the drive mechanism of each actuating unit, along the transmission axis respectively to move the first inverted wedge member of each actuating unit along the actuation axis respectively in a manner so as to actuate the second mold chase to move along the movement axis towards the first mold chase for cooperatively applying the compression force therebetween.

In Example 23, the subject matter of Example 22 may optionally include controlling the drive mechanism to move the second wedge member of each actuating unit based on a determined displacement of the first inverted wedge member of each actuating unit with respect to the base part along the actuation axis from a position sensor fixed to the first inverted wedge member of each actuating unit or to the base part for determining a displacement of the first inverted wedge member of each actuating unit with respect to the base part along the actuation axis.

In Example 24, the subject matter of Example 22 or 23 may optionally include controlling the drive mechanism to cease moving the second wedge member of each actuating unit based on a force measurement by a force sensor disposed between the drive mechanism and the second mold chase for measuring a force applied to the second mold chase by the drive mechanism.

In Example 25, the subject matter of any one of Examples 22 to 24 may optionally include
moving, via a secondary actuation arrangement, the second mold chase to a predetermined position along the movement axis prior to moving, via the compression actuation arrangement, the second mold chase towards the first mold chase for cooperatively applying the compression force therebetween.

In Example 26, the subject matter of Example 25 may optionally include that
wherein the secondary actuation arrangement is disposed between the second mold chase and the base part for moving the second mold chase along the movement axis, the secondary actuation arrangement includes at least one linear actuator coupled to the base part, the linear actuator having a linearly actuated arm to engage and move the second mold chase along the movement axis,
wherein the second mold chase includes at least two sliding support blocks underneath the second mold chase and slidable relative to the second mold chase along a sliding axis perpendicular to the movement axis of the second mold chase, wherein moving, via the secondary actuation arrangement, the second mold chase to a predetermined position includes controlling the at least one linear actuator to move the second mold chase to the predetermined position above the compression actuation arrangement, and moving the at least two sliding support blocks at the second mold chase to slide towards each other and position above the actuating units of the compression actuation arrangement respectively, wherein moving, via the compression actuation arrangement, the second mold chase towards the first mold chase further includes moving the first inverted wedge member of each actuating unit, via moving the second wedge member of each actuating unit by the driving mechanism of each actuating unit, to engage a corresponding sliding support block so as to move the second mold chase along the movement axis towards the first mold chase for cooperatively applying the compression force therebetween.

Various embodiments have provided a compression molding machine and a method of compression molding suitable for panel level molding on a large scale. Various embodiments may provide a sufficiently large compression force for applying to a large molding area. Various embodiments may also provide a sufficiently high pressure and strict degree of parallelism for panel level molding in a panel level packaging process for a panel based semiconductor assembly.

While the invention has been particularly shown and described with reference to specific embodiments, it should be understood by those skilled in the art that various changes, modification, variation in form and detail may be made therein without departing from the scope of the invention as defined by the appended claims. The scope of the invention is thus indicated by the appended claims and all changes which come within the meaning and range of equivalency of the claims are therefore intended to be embraced.

The invention claimed is:

1. A compression molding machine, comprising
   a first mold chase;
   a second mold chase opposed to the first mold chase;
   a compression actuation arrangement comprising at least two actuating units for moving the second mold chase towards the first mold chase; and
   a base part,
   wherein each of the at least two actuating unit comprises a first inverted wedge member and a second wedge member movable relative to the first inverted wedge member,
   wherein the first mold chase is fixed in a position spaced apart from the base part so as to be suspended above the base part,
   wherein the second mold chase is disposed between the base part and the first mold chase, the second mold chase being movable relative to the base part and the first mold chase along a movement axis, whereby the movement axis extends perpendicularly between the base part and the first mold chase,
   wherein the compression actuation arrangement is disposed between the second mold chase and the base part for moving the second mold chase along the movement axis,
   wherein the at least two actuating units are disposed to independently engage at least two different portions of the second mold chase respectively,
   wherein the first inverted wedge member is movable relative to the base part along an actuation axis parallel to the movement axis of the second mold chase,
   wherein the second wedge member is movable relative to the first inverted wedge member along a transmission axis perpendicular to the movement axis of the second mold chase,
   wherein each actuating unit comprises a drive mechanism coupled to the second wedge member to move the second wedge member along the transmission axis,
   wherein an inclined surface of the first inverted wedge member and an inclined surface of the second wedge member are slidably engaged to each other in a manner so as to convert a motion of the second wedge member along the transmission axis to a motion of the first inverted wedge member along the actuation axis for moving the second mold chase along the movement axis, whereby the compression actuation arrangement is operable to move the second mold chase towards the first mold chase for cooperatively applying a compression force therebetween.

2. The machine as claimed in claim 1, wherein each actuating unit comprises
   a force sensor disposed between the drive mechanism and the second mold chase for measuring a force applied to the second mold chase by the drive mechanism.

3. The machine as claimed in claim 1, wherein each actuating unit comprises
   a position sensor fixed to the first inverted wedge member or to the base part for determining a displacement of the first inverted wedge member with respect to the base part along the actuation axis.

4. The machine as claimed in claim 1, wherein the at least two actuating units are arranged to be in mirror symmetry with respect to each other in a manner such that the transmission axes of the second wedge members of the at least two actuating units are coaxial.

5. The machine as claimed in claim 1, further comprising a secondary actuation arrangement configured to engage the second mold chase for moving the second mold chase towards the first mold chase.

6. The machine as claimed in claim 1, further comprising a secondary actuation arrangement operable to engage the second mold chase for moving the second mold chase towards the first mold chase,
   wherein the secondary actuation arrangement comprises at least one linear actuator coupled to the base part, the at least one linear actuator having a linearly actuated arm to engage and move the second mold chase along the movement axis,
   wherein the compression molding machine comprises at least two sliding support blocks underneath the second mold chase and slidable relative to the second mold chase along a sliding axis perpendicular to the movement axis of the second mold chase,
   wherein the secondary actuation arrangement is operable to move the second mold chase to a predetermined position above the compression actuation arrangement in a manner so as to allow the at least two sliding support blocks to slide towards each other and position above the first inverted wedge members of the compression actuation arrangement respectively,
   wherein the compression actuation arrangement is subsequently operable to move the first inverted wedge members of the at least two actuating units to engage the at least two sliding support blocks respectively so as to move the second mold chase along the movement axis towards the first mold chase for cooperatively applying the compression force therebetween.

7. The machine as claimed in claim 6,
wherein the compression actuation arrangement comprises four actuating units disposed to form a rectangular or square pattern with each actuating unit being disposed at a corner of the rectangular or square pattern to independently actuate four different portions of the second mold chase respectively.

8. The machine as claimed in claim 7,
wherein first and second adjacent actuating units of the four actuating units along a first side of the rectangular or square pattern are arranged to be in mirror symmetry with respect to each other in a manner such that the transmission axes of the second wedge members of the first and second adjacent actuating units are coaxial,
wherein third and fourth adjacent actuating units of the four actuating units along a second side of the rectangular or square pattern are arranged to be in mirror symmetry with respect to each other in a manner such that the transmission axes of the second wedge members of the third and fourth adjacent actuating units are coaxial,
wherein the first side and the second side of the rectangular or square pattern are two opposite sides of the rectangular or square pattern.

9. The machine as claimed in claim 8,
wherein the secondary actuation arrangement comprises two linear actuators,
wherein a first of the two linear actuators is disposed outside the first side of the rectangular or square pattern,
wherein a second of the two linear actuators is disposed outside the second side of the rectangular or square pattern, and
wherein the two linear actuators are operable in a synchronous manner to move the second mold chase to the predetermined position above the compression actuation arrangement.

10. The machine as claimed in claim 7, wherein each actuating unit comprises
a force sensor disposed between the drive mechanism and the second mold chase for measuring a force applied to the second mold chase by the drive mechanism.

11. The machine as claimed in claim 7, wherein each actuating unit comprises
a position sensor fixed to the first inverted wedge member or to the base part for determining a displacement of the first inverted wedge member with respect to the base part along the actuation axis.

12. The machine as claimed in claim 1, further comprising
a first heating arrangement underneath the first mold chase, and
a second heating arrangement on an upper surface of the second mold case.

13. The machine as claimed in claim 12, further comprising a film dispenser unit disposed at the first mold chase, the film dispenser comprises
a film supply reel coupled to a first side of the first mold chase, and
a film take-up reel coupled to an opposite second side of the first mold chase,
wherein a film is suspended between the film supply reel and the film take-up reel across the first heating arrangement at the first mold plate.

14. The machine as claimed in claim 13, further comprising a film suction arrangement disposed at the first heating arrangement, the film suction arrangement comprising one or more vacuum suction ports operable to adhere the film to the first heating arrangement.

15. The machine as claimed in claim 14, further comprising a carrier attachment arrangement disposed at the second heating arrangement, the carrier attachment arrangement comprising one or more vacuum suction elements, magnetic elements, or gripping elements for attaching a carrier to the second heating arrangement at the second mold chase.

16. A method of compression molding using the compression molding machine as claimed in claim 1, comprising
moving, via a compression actuation arrangement, a second mold chase towards a first mold chase,
wherein the second mold chase is opposed to the first mold chase,
wherein the compression actuation arrangement comprises
at least two actuating units, each actuating unit comprising
a first inverted wedge member, and
a second wedge member movable relative to the first inverted wedge member.

17. The method as claimed in claim 16, further comprising
moving, via a secondary actuation arrangement, the second mold chase towards the first mold chase to a predetermined position prior to moving, via the compression actuation arrangement, the second mold chase towards the first mold chase for cooperatively applying the compression force therebetween.

* * * * *